United States Patent
Katsuragi

(10) Patent No.: US 10,990,346 B2
(45) Date of Patent: Apr. 27, 2021

(54) ELECTRONIC BLACKBOARD SYSTEM, ELECTRONIC BLACKBOARD, AND ELECTRONIC BLACKBOARD METHOD

(71) Applicant: Shiho Katsuragi, Kanagawa (JP)

(72) Inventor: Shiho Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/698,003

(22) Filed: Nov. 27, 2019

(65) Prior Publication Data

US 2020/0174732 A1    Jun. 4, 2020

(30) Foreign Application Priority Data

Nov. 30, 2018 (JP) .............................. JP2018-225090

(51) Int. Cl.
*G06F 3/147*    (2006.01)
*G06F 21/31*    (2013.01)
(Continued)

(52) U.S. Cl.
CPC .............. *G06F 3/147* (2013.01); *G06F 21/31* (2013.01); *G06Q 10/02* (2013.01); *G06Q 10/1095* (2013.01)

(58) Field of Classification Search
CPC ......... G06F 3/147; G06F 21/31; G06Q 10/02; G06Q 10/1095; H04N 7/15; H04N 7/152;
(Continued)

(56) References Cited

U.S. PATENT DOCUMENTS 8,018,398 B1 * 9/2011 Harris .................... G09G 5/005
    345/1.1
8,760,441 B2 * 6/2014 Kohara ................ G06F 3/1415
    345/204

(Continued)

FOREIGN PATENT DOCUMENTS

| JP | 2000-250861 | 9/2000 |
| JP | 2010-056979 | 3/2010 |
| JP | 2016-119074 | 6/2016 |

OTHER PUBLICATIONS

Extended European Search Report for 19211816.4 dated Apr. 22, 2020.

Primary Examiner — Tom V Sheng
(74) Attorney, Agent, or Firm — IPUSA, PLLC

(57) ABSTRACT

An electronic blackboard system including an electronic blackboard and an information processing system is disclosed. The information processing system stores content data created based on data displayed on the electronic blackboard, sets of user information each specifying one of users of the electronic blackboard, and a time period indicating a schedule to display the content data on the display part. The electronic blackboard reads out identification information associated with the user information from a storage device of the user, sends the identification information and information indicating a time when the identification information has been read out, to the information processing system, a receiving part that receives, from the information processing system, content data included in content management information, of which the time period includes the time and of which user identification matches user information corresponding to the identification information, and, and displays the content data on the display part.

3 Claims, 30 Drawing Sheets

(51) Int. Cl.
*G06Q 10/02* (2012.01)
*G06Q 10/10* (2012.01)

(58) Field of Classification Search
CPC ... H04N 7/155; H04L 65/403; H04L 12/1813; H04L 12/1818; H04L 12/1822; H04L 12/1827; H04L 12/1831
See application file for complete search history.

(56) References Cited

U.S. PATENT DOCUMENTS

| | | | | |
|---|---|---|---|---|
| 8,963,799 B2 * | 2/2015 | Harper | | G09G 5/377 345/1.1 |
| 9,031,855 B2 * | 5/2015 | Ohmura | | H04M 3/56 705/5 |
| 10,268,757 B2 * | 4/2019 | Aikawa | | G06F 21/50 |
| 10,402,857 B2 | 9/2019 | Aihara | | |
| 10,686,774 B2 * | 6/2020 | Rutherford | | H04W 12/06 |
| 2001/0035814 A1 * | 11/2001 | Uchida | | G06Q 20/40145 340/5.74 |
| 2002/0106081 A1 * | 8/2002 | Yang | | H04N 21/25875 380/201 |
| 2005/0080877 A1 * | 4/2005 | Sako | | G11B 20/00869 709/219 |
| 2005/0287998 A1 * | 12/2005 | Tonouchi | | H04L 12/1813 455/416 |
| 2009/0261944 A1 * | 10/2009 | Fukuta | | G06F 16/437 340/5.8 |
| 2011/0271129 A1 * | 11/2011 | Flannagan | | H04L 65/403 713/323 |
| 2014/0108084 A1 * | 4/2014 | Bargetzi | | H04L 63/105 705/7.19 |
| 2017/0357915 A1 | 12/2017 | Holmes et al. | | |
| 2017/0373753 A1 * | 12/2017 | Darabi | | H04B 10/66 |
| 2018/0069857 A1 | 3/2018 | Katsuragi et al. | | |
| 2019/0286405 A1 * | 9/2019 | Katsuragi | | G06F 21/31 |
| 2019/0297022 A1 * | 9/2019 | Kagawa | | H04L 47/70 |

\* cited by examiner

FIG.8

| USER ID | CONTENT DATA | DISPLAY TIME PERIOD | STATUS |
|---|---|---|---|
| 101 | ○○×××.pdf | 14:00-15:00 | NOT-DISPLAY |
| 101,102 | ××××.pdf | 10:00-11:30 | DISPLAY |
| 101,102,103 | ○×××.pdf | 15:00-15:30 | NOT-DISPLAY |
| ... | ... | ... | ... |

| USER ID | CARD ID |
|---|---|
| 101 | xxxxx |
| 102 | xxxxx |
| ... | ... |

360

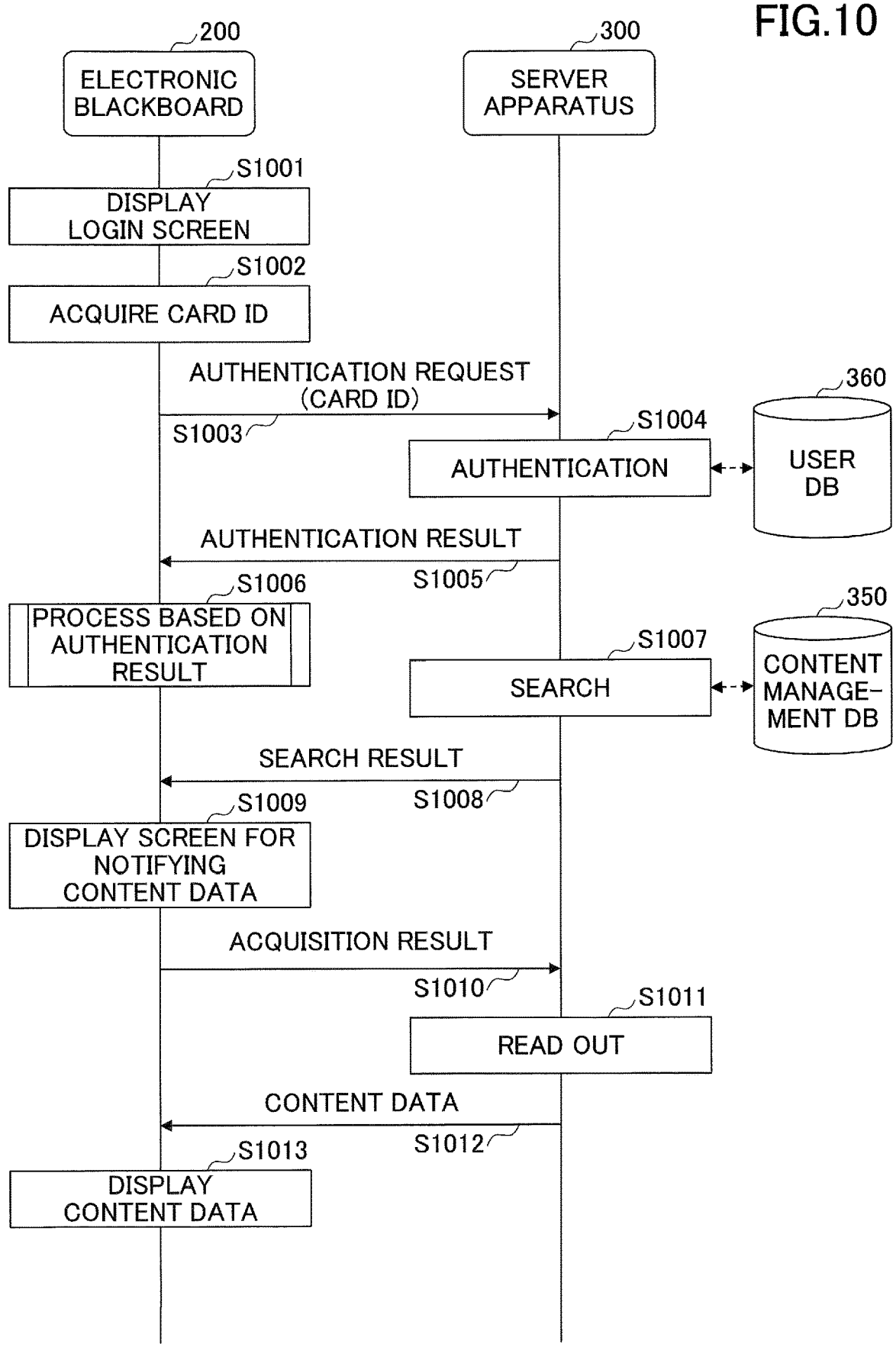

FIG.15B

| SCHEDULE | USER 101 | | | | USER 102 | | | | USER 103 | | | |
|---|---|---|---|---|---|---|---|---|---|---|---|---|
| | 1/30 | 1/31 | 2/1 | 2/2 | 2/3 | 1/30 | 1/31 | 2/1 | 2/2 | 2/3 | 1/30 | 1/31 | 2/1 | 2/2 |
| 9:00 | | | | | | | | | | | | | |
| 10:00 | MEETING (MEETING ROOM A) | | | | | MEETING (MEETING ROOM A) | | | | | | OUT OF OFFICE | |
| 11:00 | | | | | | | | | | | | | |

| DATE OF USE | FLOOR | MEETING ROOM NAME | START TIME | END TIME | USER ID | STATUS |
|---|---|---|---|---|---|---|
| 2018/01/30 | 2 | A | 10:00 | 11:00 | 101,102 | RESERVED |
| 2018/01/30 | 2 | A | 11:00 | 12:30 | 104,105,106 | RESERVED |
| 2018/01/30 | 2 | B | 15:00 | 16:00 | 103 | RESERVED |
| ... | ... | ... | ... | ... | ... | ... |

FIG.16B 450-2

| DATE OF USE | FLOOR | MEETING ROOM NAM | START TIME | END TIME | USER ID | STATUS |
|---|---|---|---|---|---|---|
| 2018/01/30 | 2 | A | 10:02 | 11:00 | 101,102 | IN USE |
| 2018/01/30 | 2 | A | 11:01 | 12:30 | 104,105,106 | RESERVED |
| 2018/01/30 | 2 | B | 15:05 | 16:00 | 103 | IN USE |
| ... | ... | ... | ... | ... | ... | ... |

FIG.17

| USER ID | CONTENT DATA | MOVE-TO MEETING ROOM NAME | RESERVATION TIME |
|---|---|---|---|
| 101,102 | WB20180125-101531.pdf | B | 11:00-12:00 |
| 104,105,106 | WB20180125-112445.pdf | - | - |
| 103 | WB20180125-095526.pdf | A | 16:00-17:00 |
| ... | ... | ... | ... |

350A

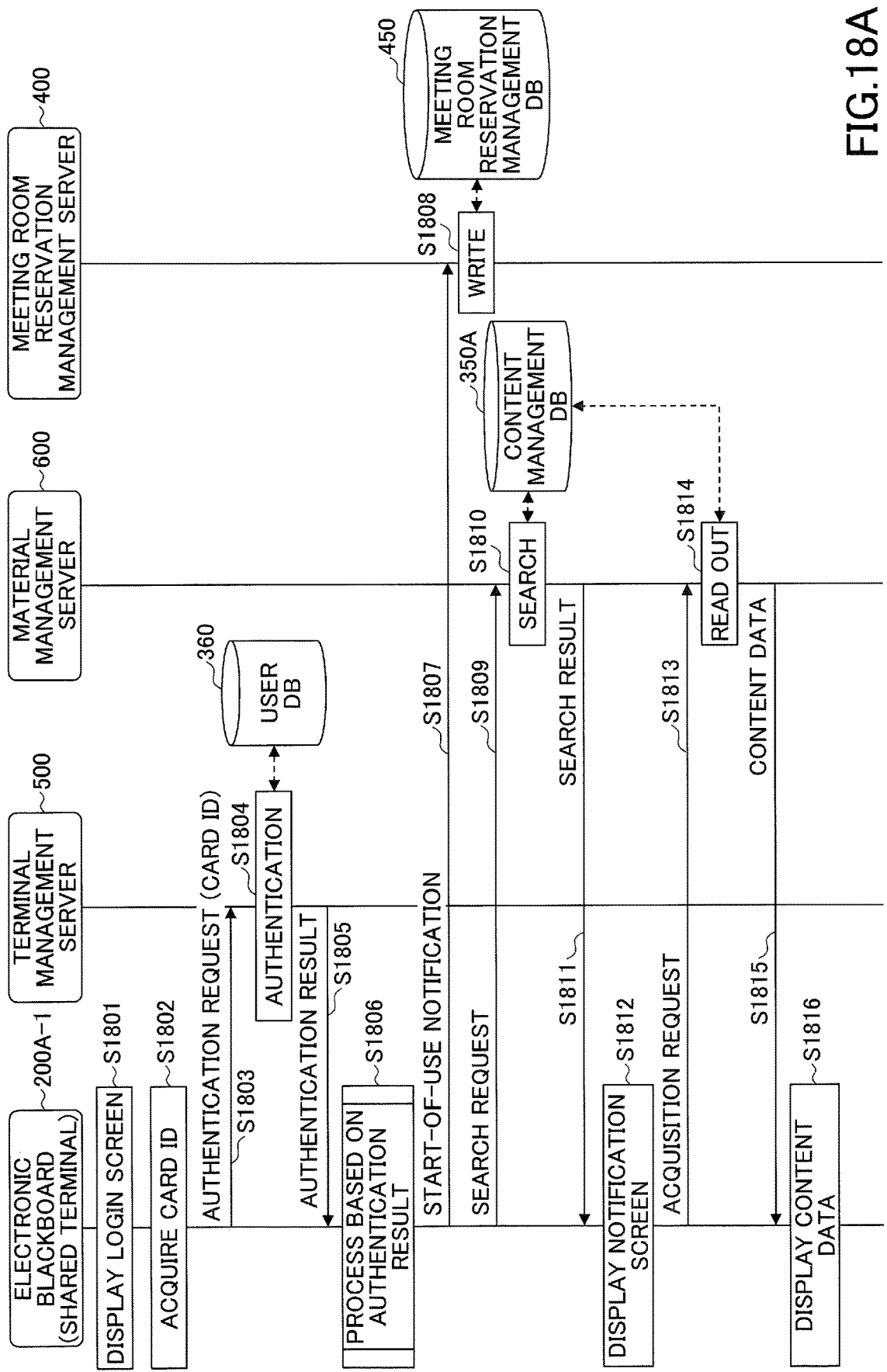

ELECTRONIC BLACKBOARD SYSTEM, ELECTRONIC BLACKBOARD, AND ELECTRONIC BLACKBOARD METHOD

CROSS-REFERENCE TO RELATED APPLICATION

The present application claims priority under 35 U.S.C. § 119 to Japanese Patent Application No. 2018-225090 filed on Nov. 30, 2018, the entire contents of which are incorporated herein by reference.

BACKGROUND OF THE INVENTION

1. Field of the Invention

The present invention is related to an electronic blackboard system, an electronic blackboard, and an electronic blackboard method.

2. Description of the Related Art

Recently, an electronic blackboard shared by multiple users has been installed in a meeting room of a company or a classroom of an educational institution. The electronic blackboard has a large touch panel display to display images drawn by each user using a dedicated electronic pen (stylus), finger, or the like. As a result, each user is able to proceed with a meeting or a class while viewing the same drawing (see Patent Document 1).

In recent years, a technique is known for a user having a non-contact type IC card to log in a system by holding the IC card over a recorder (Patent Document 2).

PATENT DOCUMENTS

[Patent Document 1] Japanese Laid-Open Patent Application No. 2010-56979

[Patent Document 2] Japanese Laid-Open Patent Application No. 2000-250861

SUMMARY OF THE INVENTION

In one aspect of this disclosure, an electronic blackboard system, including: an electronic blackboard; and an information processing system, wherein the information processing system includes a content management part that stores content data created based on data displayed on a display part of the electronic blackboard, a plurality of sets of user information each specifying one of a plurality of users of the electronic blackboard, and a time period indicating a schedule to display the content data on the display part, which are associated with each other, and wherein the electronic blackboard includes a read-out part that reads out identification information associated with the user information from a storage device possessed by a user; a sending part that sends the identification information and information indicating a time when the identification information has been read out, to the information processing system; a receiving part that receives, from the information processing system, content data included in content management information, of which the time period includes the time and of which user identification matches user information corresponding to the identification information; and a display control part that displays the received content data on the display part.

BRIEF DESCRIPTION OF THE DRAWINGS

In the following, embodiments of the present invention will be described with reference to the accompanying drawings.

FIG. 8 is a diagram illustrating an example of a content management DB according to the first embodiment;

FIG. 9 is a diagram illustrating an example of a user DB in the first embodiment;

FIG. 10 is a sequence diagram illustrating an operation of the electronic blackboard system in the first embodiment;

FIG. 15B is a diagram illustrating an example of a schedule table displayed on the personal terminal;

FIG. 16A is a diagram illustrating an example of a meeting room reservation management in a state in which a plurality of meeting rooms are reserved;

FIG. 16B is a diagram illustrating an example of a meeting room reservation management DB in a state in which a scheduled meeting room is in use;

FIG. 17 is a diagram illustrating a content management DB in the second embodiment;

FIG. 18A and FIG. 18B illustrates a first sequence diagram illustrating an operation of the electronic blackboard system in the second embodiment;

DESCRIPTION OF THE PREFERRED EMBODIMENTS

An electronic blackboard will be briefly described. The electronic blackboard allows a user to log in to a system including the electronic blackboard using an IC card or the like; however, data displayed on the electronic blackboard is not associated with the user. Therefore, in order for the user to display desired data on the electronic blackboard, the user logs into the system, and then, conducts an operation of specifying a storage location of data to be displayed and for reading out the data from the specified storage location. These operations are complicated for the user.

The following disclosed technique has been developed to solve these problems in view of the above circumstances and is intended to easily display the desired data on the electronic blackboard.

First Embodiment

Figure 1:
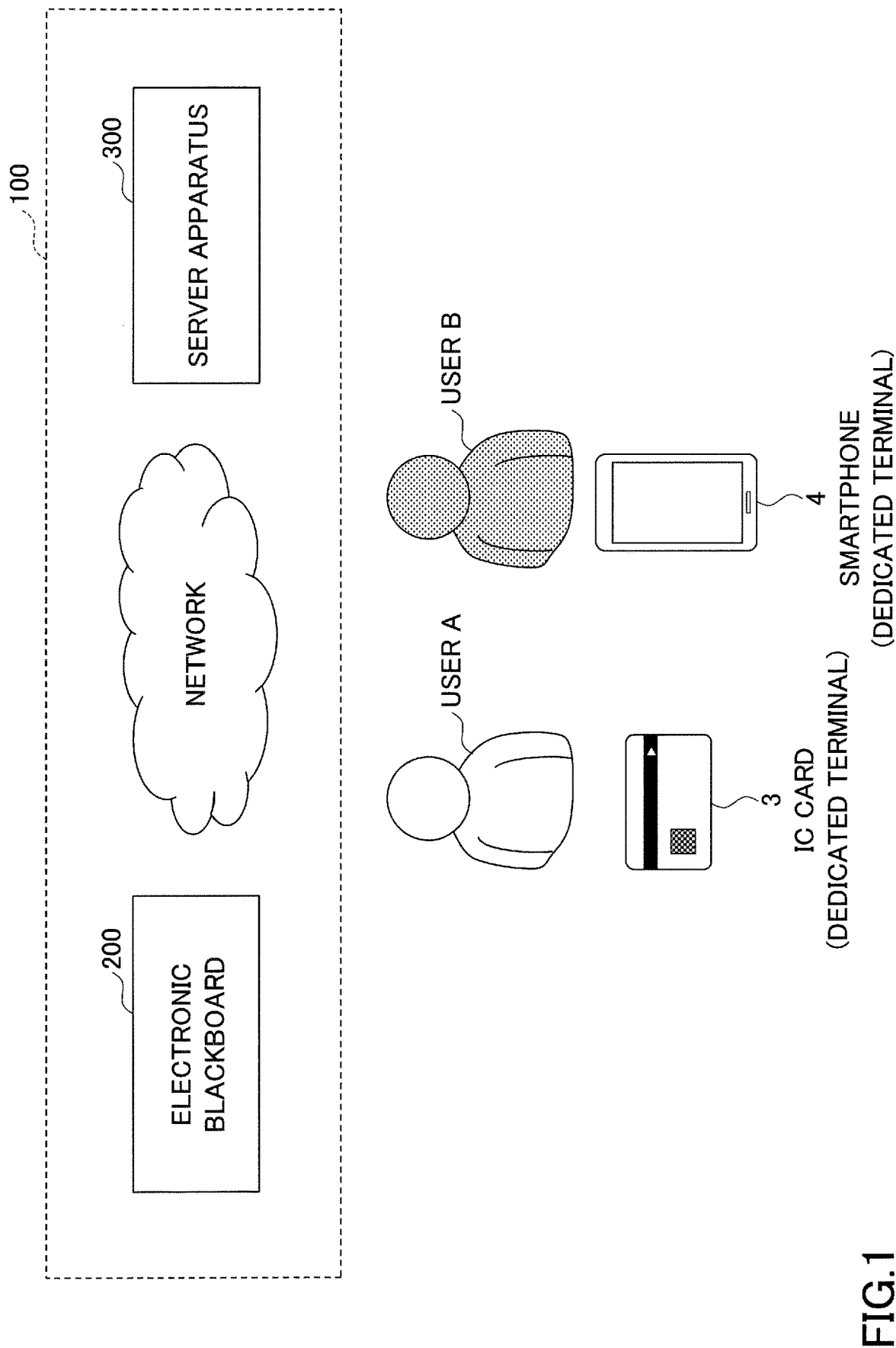
FIG. 1 is a diagram illustrating an example of a system configuration of an electronic blackboard system according to a first embodiment.

The first embodiment will be described with reference to the drawings. FIG. 1 is a diagram illustrating an example of a system configuration of an electronic blackboard system according to the first embodiment.

An electronic blackboard system 100 according to the first embodiment includes an electronic blackboard 200 and a server apparatus 300. In the electronic blackboard system 100, the electronic blackboard 200 and the server apparatus 300 are connected via a network.

Moreover, in the electronic blackboard system 100 of the first embodiment, when a dedicated terminal is denied to the electronic blackboard 200, the electronic blackboard 200 reads identification information for identifying a user from the dedicated terminal, sends the identification information to the server apparatus 300, and the server apparatus 300 authenticates the user.

The dedicated terminal according to the first embodiment may be a non-contact type IC card 3 or a smartphone 4, for example, as illustrated in FIG. 1. The IC card 3 and the smartphone 4 are examples of dedicated terminals. The dedicated terminal according to the first embodiment may be, for example, a semiconductor integrated device, in which a memory storing identification information for identifying a user is mounted. That is, the dedicated terminal according to the first embodiment may be a storage device capable of storing the identification information of the user.

In the example of FIG. 1, the IC card 3 stores information for identifying a user A. More specifically, in the server apparatus 300, the identification information stored in the IC card 3 is associated with information identifying the user A.

The smartphone 4 stores information to identify a user B. More specifically, in the server apparatus 300, the terminal ID and information for identifying the user B are associated with each other in order to identify the smartphone 4. In the following description, the information used to identify each user is called a user ID. That is, the user ID is user information to identify the user.

In the electronic blackboard system 100 according to the first embodiment, in the server apparatus 300 stores, data to display on the electronic blackboard 200, a plurality of user IDs, and a time period during which data is to be displayed, are stored in advance. The time period indicates the time of a certain range from a time to another time. For example, a user identified by a plurality of a user ID is a meeting participant referring to data displayed on an electronic blackboard 200.

In the electronic blackboard system 100, for example, the user ID of the user A and the user ID of the user B are associated with data to display on the electronic blackboard 200 and a time period during which data is to be displayed.

In the electronic blackboard system 100, for example, when the user A holds the IC card 3 over the electronic blackboard 200 and is authenticated by the server apparatus 300, the server apparatus 300 displays data associated with the user A and the time when the IC card 3 is held over the electronic blackboard 200.

Also, in the electronic blackboard system 100, for example, in place of the user A, when the user B holds the IC card 3 over the electronic blackboard 200 and is authenticated by the server apparatus 300, the server apparatus 300 displays data corresponding to the user B and the time when the IC card 3 is held over the electronic blackboard 200.

In the electronic blackboard system 100 according to the first embodiment, it is possible for a user to easily display desired data on the electronic blackboard 200 without specifying a storage location of the desired data and without reading out, after logging in the electronic blackboard 200 by holding a dedicated terminal over the electronic blackboard 200.

In addition, according to the first embodiment, any user associated with the data to be displayed is able to easily display the desired data on the electronic blackboard 200. Accordingly, for example, in the case in which a meeting is held by displaying data on the electronic blackboard 200, it is possible to easily display the desired data of the user on the electronic blackboard 200 by matching data with the expected attendees of the meeting. Thus, for example, even if a data registrant who has stored data in the server apparatus 300 is suddenly unable to attend the meeting, other scheduled attendees are able to have the data to be displayed on the electronic blackboard 200 at the time when the meeting is held.

Figure 2:
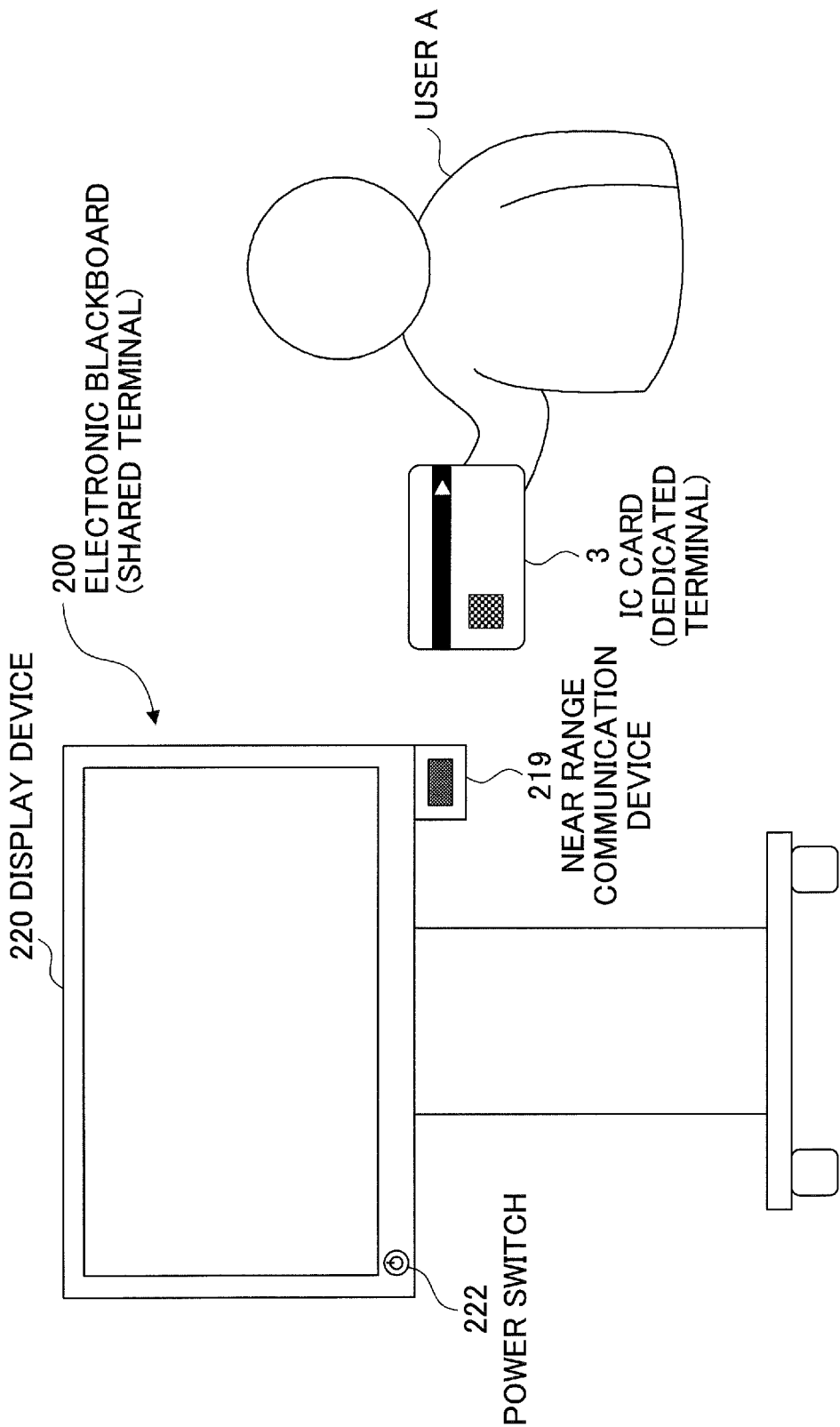
FIG. 2 is a diagram illustrating a state, in which a user utilizes an electronic blackboard.

FIG. 2 is a diagram illustrating a state, in which a user utilizes an electronic blackboard. In the example of FIG. 2, the user A logs in to the electronic blackboard system 100 using the IC card 3.

The electronic blackboard 200 includes a near range communication device 219. In the first embodiment, first, the user A having the IC card 3 moves to an installation location of the electronic blackboard 200, and as illustrated in FIG. 2, the user A holds the IC card 3 over the near range communication device 219 of the electronic blackboard 200 after a power switch 222 of a display device 220 is turned on.

Then, the electronic blackboard 200 acquires a card ID for identifying the IC card 3 from the IC card 3 and sends the card ID to the server apparatus 300. The server apparatus 300 allows the user A to log in to the electronic blackboard system 100 when the card ID and the user ID are associated with each other in the server apparatus 300.

The card ID is, for example, a unique ID for identifying the IC card 3 or a number having 8 to 16 characters including any numerals from 0 to 9 and any alphabets from A to F. Specifically, for example, in a case in which the IC card is a MIFERA (registered trademark) card, the card ID is a number called UiD, and in a case in which the IC card is a Felica card, the card ID is a number called IDm.

A mail address or a user ID may be written in the IC card 3 in the first embodiment. In this case, the electronic blackboard 200 may send the mail address or the user ID written on the IC card 3 to the server apparatus 300, and the server apparatus 300 may permit login using the mail address or the user ID.

Hereinafter, hardware configurations of the electronic blackboard 200, a server apparatus, and potential dedicated terminals, which may be included in the electronic blackboard system 100, will be described with reference to FIG. 3 to FIG. 6.

Figure 3:
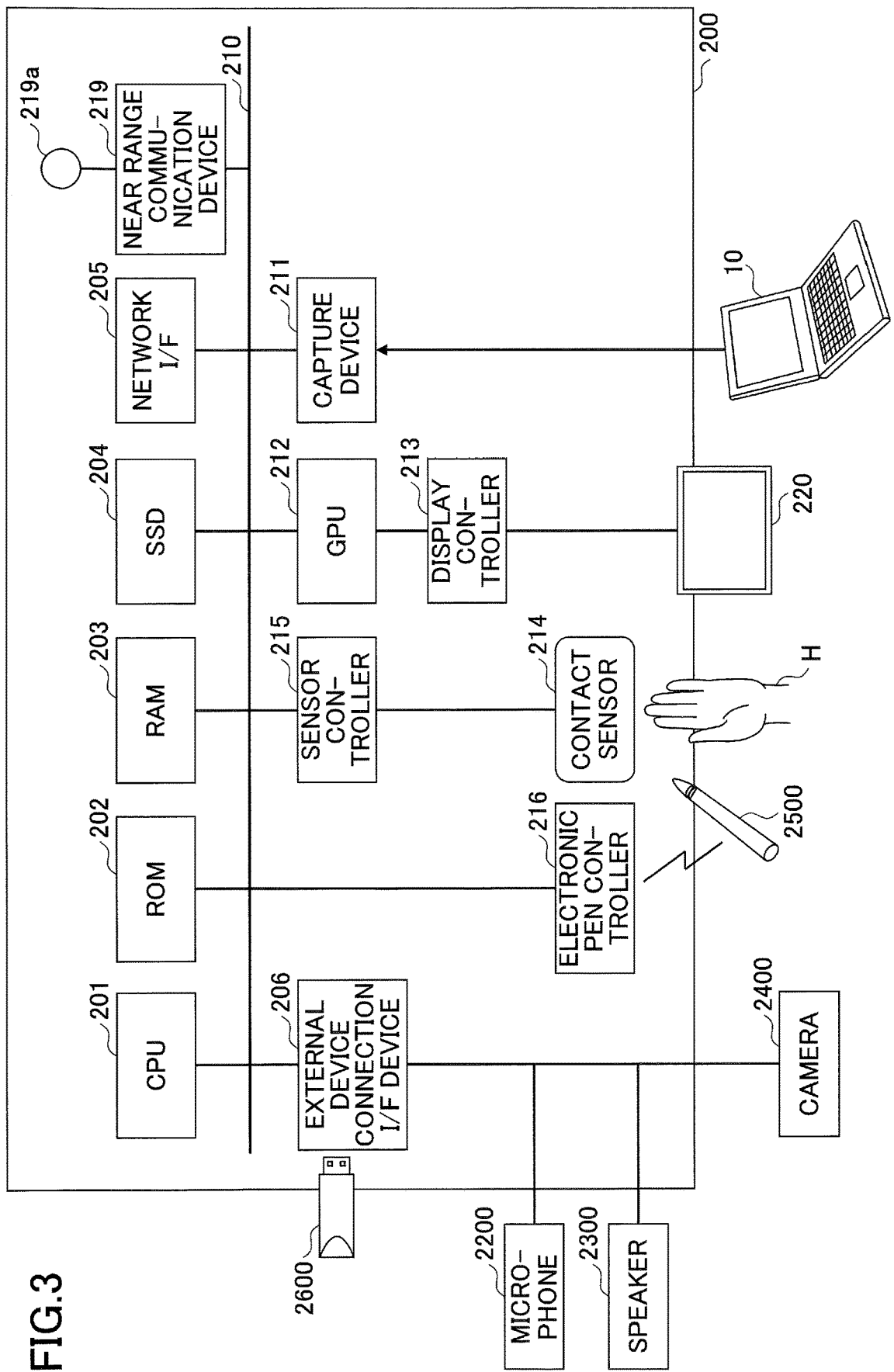
FIG. 3 is a diagram illustrating an example of a hardware configuration of the electronic blackboard according to the first embodiment.

FIG. 3 is a diagram illustrating an example of a hardware configuration of the electronic blackboard according to the first embodiment. The electronic blackboard 200 according to the first embodiment includes a Central Processing part (CPU) 201, a Read Only Memory (ROM) 202, a Random Access Memory (RAM) 203, a Solid State Drive (SSD) 204, a network InterFace (I/F) 205, and an external device connection I/F device 206, and is regarded as a shared terminal for sharing information among a plurality of users.

In this hardware configuration, the CPU 201 controls an operation of the entire electronic blackboard 200. The ROM 202 stores programs used to drive the CPU 201, such as the CPU 201 and an Initial Program Loader (IPL). RAM 203 is used as a work area of CPU 201. The SSD 204 stores various data, such as programs for the electronic blackboard 200. The network I/F 205 controls communication with through the network. The external device connection I/F device 206 controls communication with a USB (Universal Serial Bus) memory 2600 and external devices (camera 2900, speaker 2800, microphone 2700, and the like).

The electronic blackboard 200 also includes a capture device 211, a GPU (Graphics Processing part) 212, a display controller 213, a contact sensor 214, a sensor controller 215, an electronic pen controller 216, a near range communication device 219, and an antenna 219a of the near range communication device 219.

In this configuration, the capture device 211 causes the PC 10 to display video information as a still image or a movie. GPU 212 is a semiconductor chip specializing in graphics. The display controller 213 controls and manages a screen to output an output image from the GPU 212 to the display device 220 or the like.

The contact sensor 214 detects that an electronic pen 2500, a hand H of a user, or the like is in contact with the display device 220. The sensor controller 215 controls a process of the contact sensor 214. The contact sensor 214 inputs coordinates and detects coordinates in an infrared cutoff manner. A method for inputting and detecting the coordinates may be a method, in which two light emitting/receiving devices installed at both upper ends of the display device 220 emit a plurality of infrared rays in parallel with the display device 220, the infrared rays are reflected by a reflecting member provided around the display device 220, returns on the same optical path as that emitted by the light emitting/receiving devices, and two light emitting/receiving devices receives the returned infrared rays.

The contact sensor 214 outputs the infrared ID, emitted by the two light emitting/receiving devices interrupted by the object, to the sensor controller 215, and the sensor controller 215 determines a coordinate position, which is a contact position of an object. The electronic pen controller 216 communicates with the electronic pen 2500 to determine whether there is a touch on a tip of a pen (stylus) or an end of the pen to the display device 220. The near range communication device 219 may be a communication circuit such as Near field communication (NFC), Bluetooth (registered trademark), or the like.

Additionally, the electronic blackboard 200 includes a bus line 210. The bus line 210 is an address bus, a data bus, or the like for electrically connecting components such as the CPU 201 and the like.

The contact sensor 214 is not limited to the infrared interruption method. Any one of various detection means may be used, such as a touch panel having an electrostatic capacitance method in which a contact position is specified by sensing a change in capacitance, a touch panel having a resistive film method in which a contact position is specified by a voltage change of two opposing resistive films, and an electromagnetic induction type touch panel in which an electromagnetic induction caused by a contact object in contact with a display portion is sensed and a contact position is specified. Also, the electronic pen controller 216 may determine not only the tip of the pen of the electronic pen 2500 and the end of the pen, but also presence or absence of a touch in a portion where a user holds the electronic pen 2500 or in another portion of the electronic pen.

Figure 4:
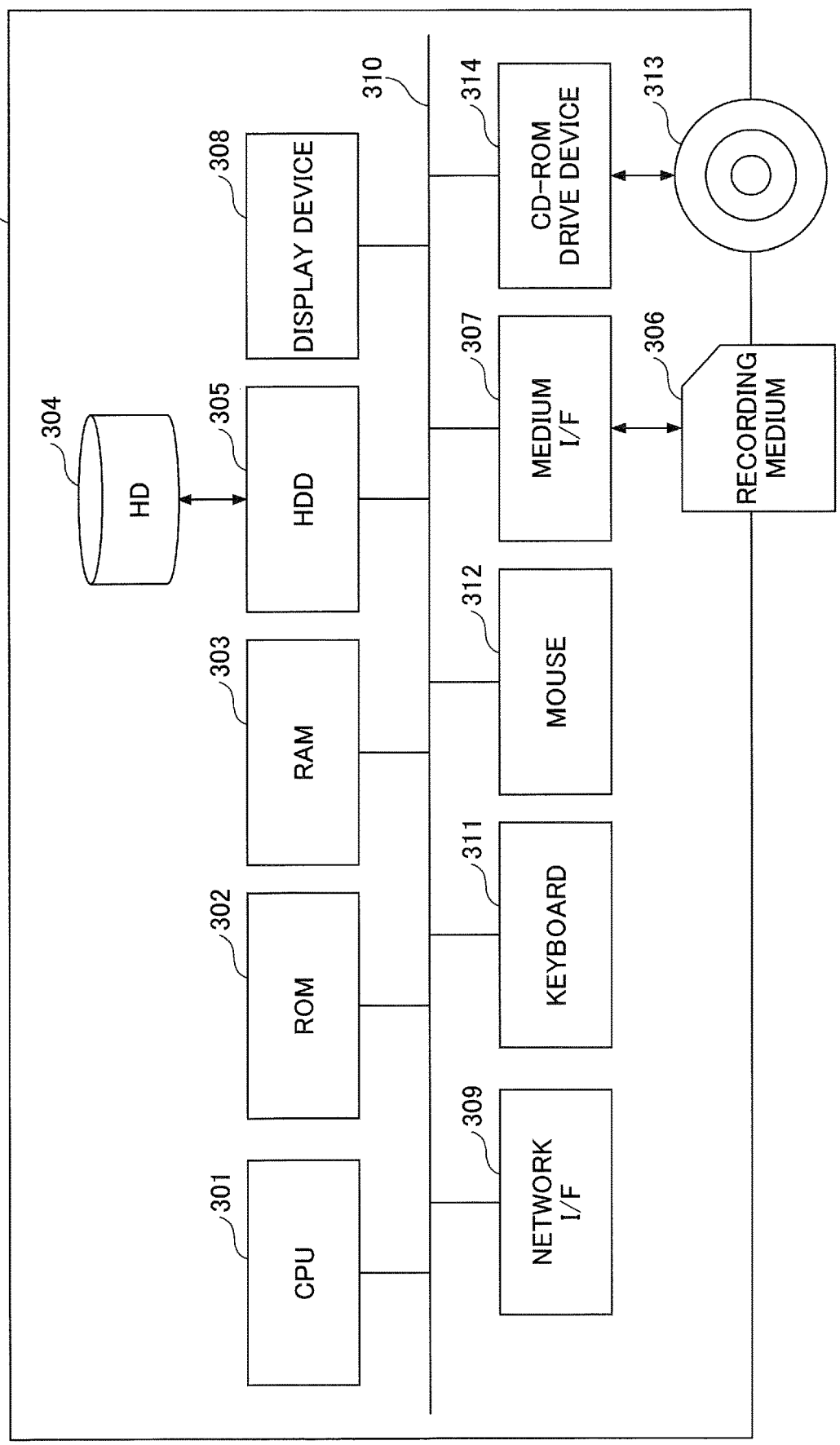
FIG. 4 is a diagram illustrating an example of a hardware configuration of a server apparatus according to the first embodiment.

FIG. 4 is a diagram illustrating an example of a hardware configuration of the server apparatus according to the first embodiment. The server apparatus 300 includes a CPU 301, a ROM 302, a RAM 303, a HD (hard disk) 304, HDD (hard disk drive) 305, a recording medium 306, a medium I/F 307, a display device 308, a network I/F 309, a keyboard 311, a mouse 312, a CD-ROM (Compact Disc Read Only Memory) drive device 314, and a bus line 310.

In this configuration, the CPU 301 controls an operation of the entire server apparatus 300. The ROM 302 stores a program used to drive the CPU 301, such as an IPL. The RAM 303 is used as a work area of the CPU 301. The HD 304 stores various data such as a program. The HDD 305 controls reading or writing of various data to the HD 304 according to control of the CPU 301.

The medium I/F 307 controls reading or writing (storing) of data to the recording medium 306, such as a flash memory. The display device 308 displays various information items such as a cursor, a menu, a window, characters, or images. The network I/F 309 is an interface for performing data communication using the network.

The keyboard 311 corresponds to an input part having a plurality of keys used to input characters, numerals, various indications, and the like. The mouse 312 corresponds to another input part for selecting and executing various instructions, selecting a processing target, moving the cursor, and the like. The CD-ROM drive device 314 controls reading or writing of various data to the CD-ROM 313 as an example of a removable storage medium. The bus line 310 is an address bus, a data bus, or the like for electrically connecting components such as the CPU 301 illustrated in FIG. 4.

Figure 5:
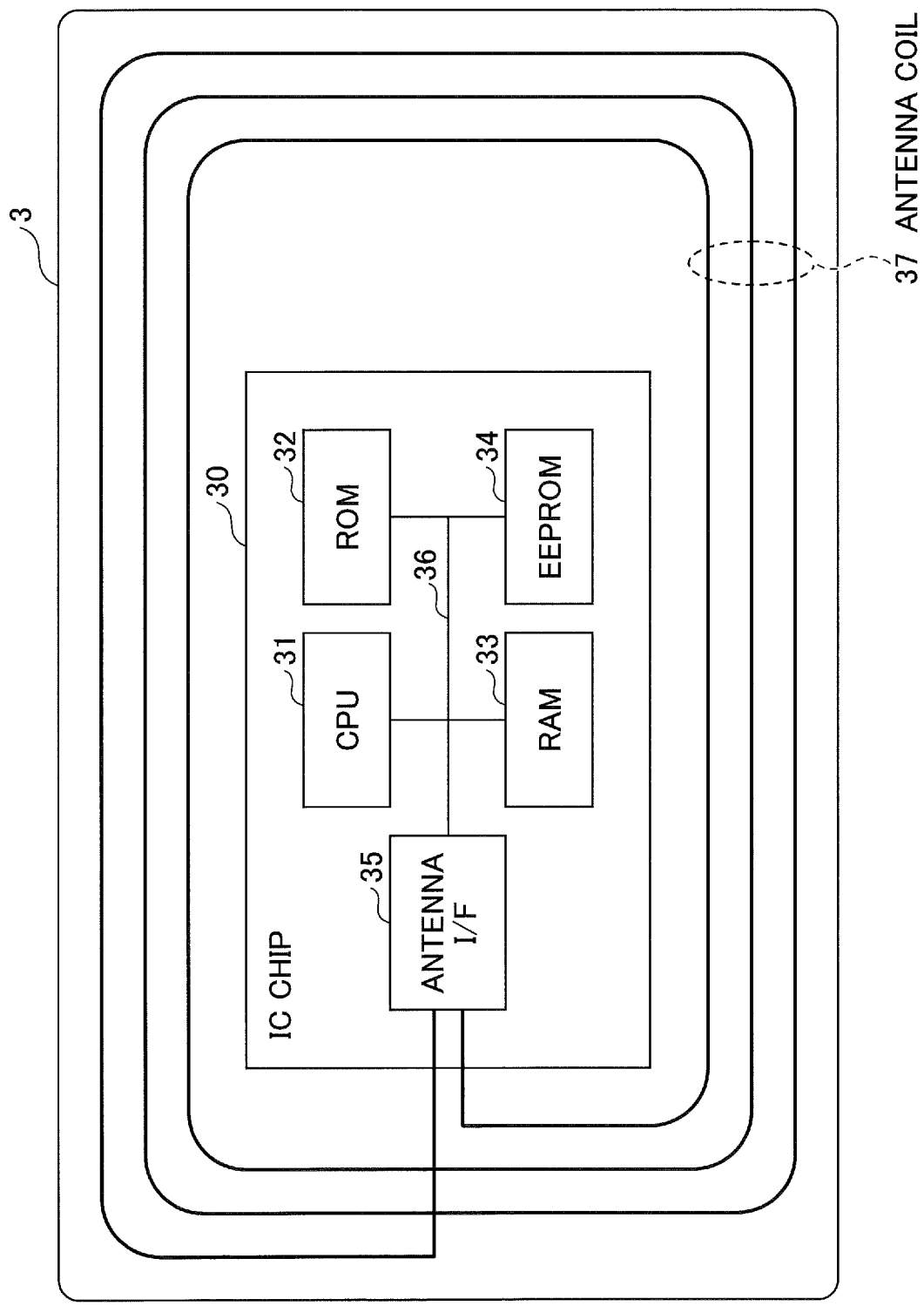
FIG. 5 is a diagram illustrating an example of a hardware configuration of an IC card according to the first embodiment.

FIG. 5 is a diagram illustrating an example of a hardware configuration of an IC card according to the first embodiment. In FIG. 5, a non-contact type configuration will be described, but the IC card 3 may be the contact type. The IC card 3 includes an IC chip 30 and an antenna coil 37. The IC chip 30 further includes a CPU 31, a ROM 32, a RAM 33, an EEPROM (Electrically Erasable and Programmable ROM) 34, and an antenna I/F 35.

In this configuration, the CPU 31 controls an operation of the entire IC card 3. The ROM 32 stores the program used to drive the CPU 31. RAM 33 is used as a work area of the CPU 31. The EEPROM 34 stores various data sets such as a program for the IC card 3, a terminal ID for identifying the IC card 3, and the like. The antenna I/F 35 controls sending and receiving of data to and from an external apparatus via the antenna coil 37.

The IC card 3 further includes a bus line 36. The bus line 36 may be an address bus, a data bus, or the like for electrically connecting components such as the CPU 31, or the like.

The antenna coil 37 is a coil for receiving an IC card 3 and generating an electric current when the IC card 3 passes through a magnetic field generated by an external device. By using this electricity, the IC card 3 activates the IC chip 30, communicates with a reader or a writer of an external device, and acquires and provides data.

Figure 6:
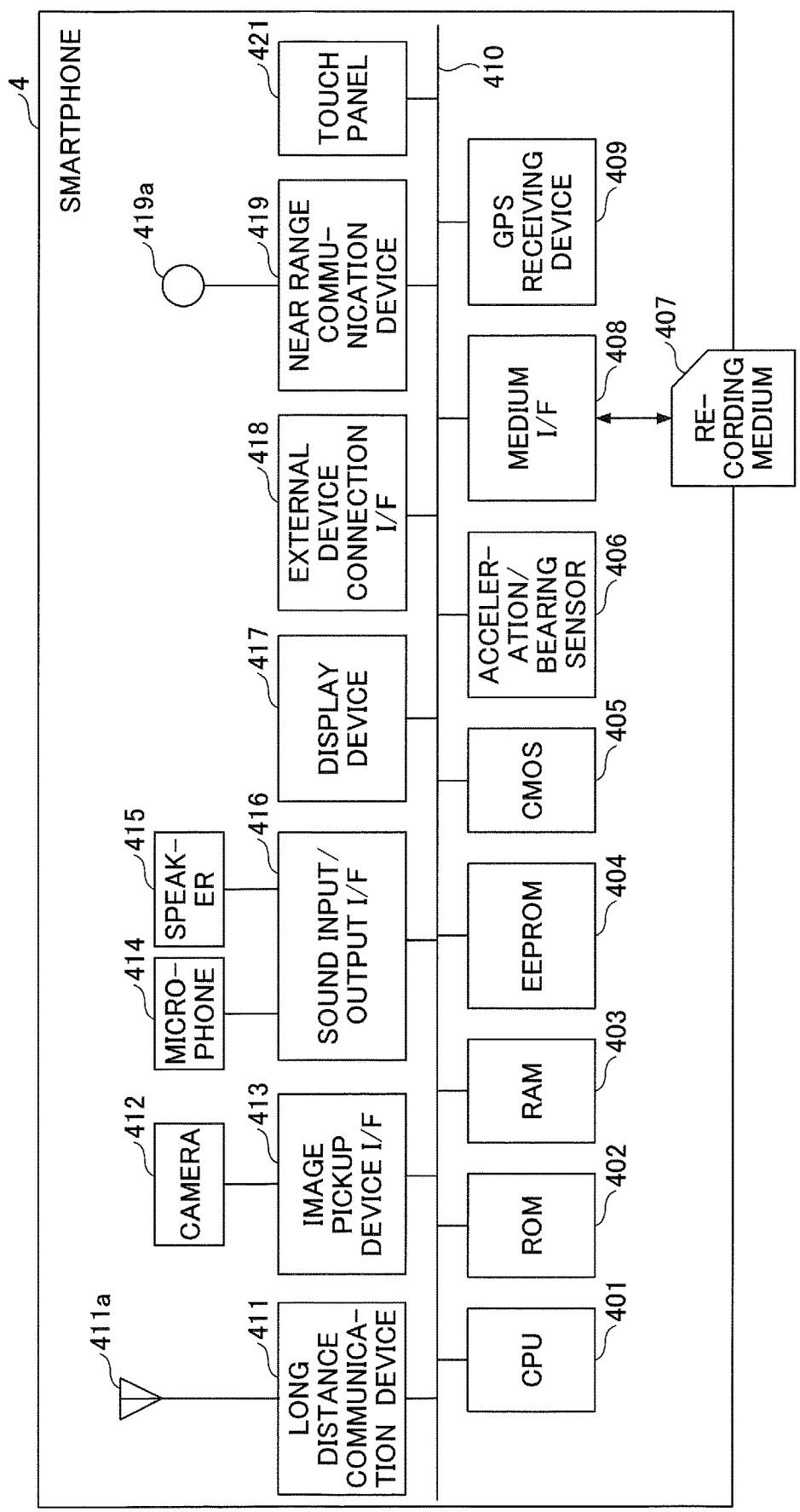
FIG. 6 is a diagram illustrating an example of a hardware configuration of a smartphone according to the first embodiment.

FIG. 6 is a diagram illustrating an example of a hardware configuration of the smartphone according to the first embodiment.

The smartphone 4 includes a CPU 401, a ROM 402, a RAM 403, an EEPROM 404, a CMOS (Complementary Metal Oxide Semiconductor) sensor 405, an acceleration/bearing sensor 406, a medium I/F 408, and a GPS (Global Positioning System) receiving device 409.

In this configuration, the CPU 401 controls an operation of the entire smartphone 4. The ROM 402 stores a program used to drive the CPU 401, such as the CPU 401 and an IPL. RAM 403 is used as a work area of CPU 401. The EEPROM 404 reads out or writes various data sets such as a smartphone program according to control of the CPU 401.

The CMOS sensor 405 captures a subject (mainly a self-image) and obtains image data according to the control of the CPU 401. The acceleration and orientation sensor 406 is a variety of sensors, such as an electromagnetic compass, a gyrocompass, and an acceleration sensor for detecting geomagnetic fields. The media I/F 408 controls the reading or writing (storing) of data to a recording medium 407, such as a flash memory. The GPS receiving device 409 receives a GPS signal from a GPS satellite.

The smartphone 4 includes a long distance communication device 411, a camera 412, an image pickup device I/F 413, a microphone 414, a speaker 415, a sound input/output I/F 416, a display device 417, an external device connection I/F 418, a near range communication device 419, an antenna 419a of the near range communication device 419, and a touch panel 421.

In this configuration, the long distance communication device 411 is a circuit for communicating with other devices via the network. The camera 412 corresponds to a type of a built-in imaging device that captures a subject according to a control of the CPU 401 to obtain image data. The image pickup device I/F 413 is regarded as a circuit that controls the drive of the camera 412. The microphone 414 is a type of a built-in sound collecting device for inputting sound.

The sound input/output I/F 416 is a circuit that processes sound signals between the microphone 414 and the speaker 415 according to the control of the CPU 401. The display device 417 is a component such as a liquid crystal or an organic EL, for displaying an image of a subject or various icons. The external device connection I/F 418 is regarded as an interface for connecting various external devices. The near range communication device 419 is a communication circuit such as NFC or Bluetooth. The touch panel 421 is regarded as a type of an input device that operates the smartphone 4 when a user presses the display device 417.

The smartphone 4 also includes a bus line 410. The bus line 410 is an address bus, data bus, or the like for electrically connecting components such as the CPU 401 and the like illustrated in FIG. 4.

Figure 7:
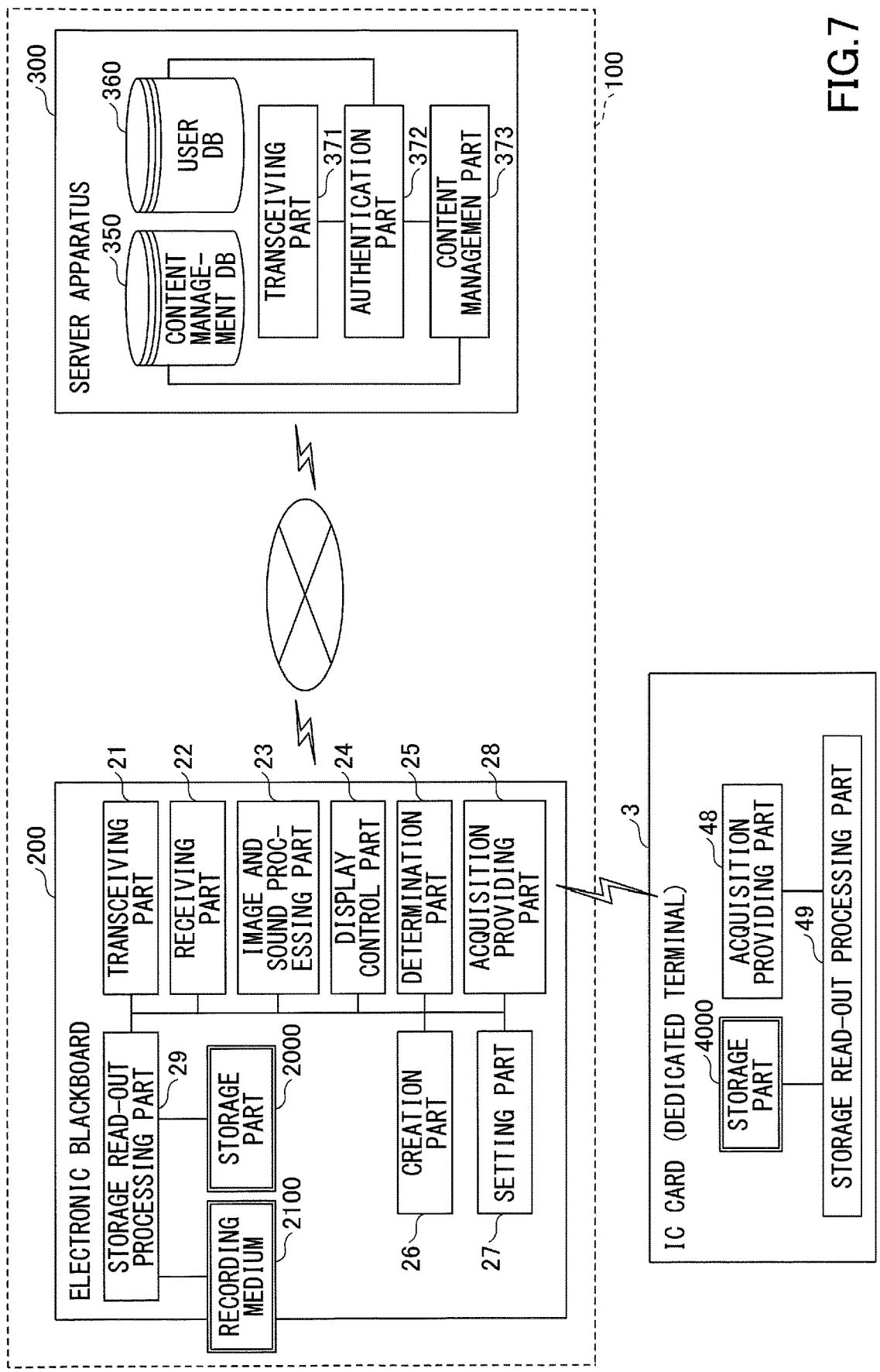
FIG. 7 is a diagram illustrating a function of each apparatus included in the electronic blackboard system according to the first embodiment.

Next, a function of each device of the electronic blackboard system 100 will be described with reference to FIG. 7. FIG. 7 is a diagram illustrating the function of each apparatus included in the electronic blackboard system according to the first embodiment.

First, a function of the electronic blackboard 200 will be described.

The electronic blackboard 200 according to the first embodiment includes a transceiving part 21, a receiving part 22, an image and sound processing part 23, a display control part 24, a determination part 25, a creation part 26, a setting part 27, an acquisition providing part 28, and a storage read-out processing part 29. Each of parts in this configuration is realized by the CPU 201 reading out and executing a corresponding program stored in the SSD 204. The electronic blackboard 200 according to the first embodiment includes a storage part 2000. The storage part 2000 is realized by a storage device such as the SSD 204 of the electronic blackboard 200.

The transceiving part 21 sends various data sets (or information items) to and from the server apparatus 300 through the network. That is, the transceiving part 21 has a role of a sending part that sends various information items from the electronic blackboard 200 to the server apparatus 300 and a receiving part that receives various information items from the server apparatus 300. The receiving part 22 is implemented by the contact sensor 214 and the electronic pen controller 216, and receives various inputs from a user.

The image and sound processing part 23 performs an image processing on image data obtained when a camera 2400 captures a subject. The image and sound processing part 23 performs voice processing on voice data related to a voice signal after voice of a user is converted into the voice signal by a microphone 2200. The image and sound processing part 23 provides the voice signal related to the voice data to a speaker 2300 and outputs a voice from the speaker 2300.

The image and sound processing part 23 performs a process for converting a stroke image, which is obtained by being drawn on the display device 220 with the electronic pen 2500 or the hand H of the user, into coordinate data. For example, when the electronic blackboard 200 sends the coordinate data to another electronic blackboard, another electronic blackboard displays an image of the same content on a display device based on the coordinate data.

The display control part 24 displays drawing image on the display device 220. The determination part 25 determines whether or not the terminal ID has been acquired from the IC card 3 or the smartphone 4.

The creation part 26 creates image data in a Portable Document Format (PDF) from drawing image data in a bit map format obtained by drawing by a user. The creation part 26 creates image data in a Refined Printing Command Stream (RPCS) format from image data in the bit map format obtained by drawing by the user. The image data created by the creation part 26 may be not only in the RPCS format, but also in the PDL format or a Post Script (PS) format.

In the following description, the image data created by the creation part 26 is called the content data. The content data in the first embodiment also includes various types of data sets sent from the electronic blackboard 200 to the server apparatus 300. Accordingly, the content data in the first embodiment includes audio data, image data, video data, stroke information, and the like.

The setting part 27 performs various settings on the electronic blackboard 200, such as, for example, setting of a destination for sending image data.

The acquisition providing part 28 acquires and provides data by short distance communication with a dedicated terminal such as the IC card 3 or the smartphone 4. The short distance communication is conducted by the near range communication device 219 and the antenna 219*a*. That is, the acquisition providing part 28 acts as a read-out part that reads identification information stored in a dedicated terminal from the dedicated terminal.

The storage read-out processing part 29 performs a process for storing various data sets in the storage part 2000 or a recording medium 2100, and a process for reading out various data stored in the storage part 2000 or the recording medium 2100. The storage part 2000 overwrites and stores image data and sound data received when communicating with other electronic blackboards or video meeting terminals. The recording medium 2100 is realized, for example, by a USB memory 2600.

Next, a function of the server apparatus 300 will be described. The server apparatus 300 according to the first embodiment includes a content management database (DB) 350, a user DB 360, a transceiving part 371, an authentication part 372, and a content management part 373.

The content management DB 350 and the user DB 360 are implemented in a storage device such as the HD 304 or the like.

The transceiving part 371, the authentication part 372, and the content management part 373 are realized in that the CPU 301 reads out and executes a program stored in the ROM 302 or the like.

The content management DB 350 stores content data received from the electronic blackboard 200 in association with a user ID or the like for identifying a user.

The user DB 360 stores identification information for identifying a dedicated terminal in association with the user ID. The content management DB 350 and the user DB 360 may be provided in the server apparatus 300 in advance, and details of the content management DB 350 and the user DB 360 will be described below.

The transceiving part 371 sends and receives various data sets through the electronic blackboard 200 and the network.

When the identification information read from the dedicated terminal is received by the electronic blackboard 200 from the electronic blackboard 200, the authentication part 372 authenticates a user of the dedicated terminal by referring to the user DB 360. Specifically, the authentication part 372 determines whether or not the user ID associated with the received identification information exists in the user DB 360. When the corresponding user ID exists, the user of the dedicated terminal is successfully authenticated. When the user ID corresponding to the user DB 360 does not exist, the authentication part 372 fails to authenticate the user of the dedicated terminal.

The content management part 373 specifies the content data associated with the user ID of the user who succeeded in authentication by the authentication part 372 by referring to the content management DB 350, and sends the specified content data to the electronic blackboard 200 by the transceiving part 371.

The server apparatus 300 according to the first embodiment is regarded as a single apparatus; however, the server apparatus 300 is not limited to this configuration. The server apparatus 300 may be an information processing system formed by a plurality of apparatuses.

Next, a function of the dedicated terminal will be described. In FIG. 7, a function of the IC card 3 will be described as an example of the dedicated terminal.

The IC card 3 includes an acquisition providing part 48, a storage read-out processing part 49, and a storage part 4000. The acquisition providing part 48 acquires and provides data by short distance communication with the electronic blackboard 200.

The storage read processing part 49 performs a process for storing various data sets in the storage part 4000 or a process for reading out various data sets stored in the storage part 4000. The storage part 4000 stores the card ID for identifying the IC card 3.

Next, the content management DB 350 and the user DB 360 will be described with reference to FIG. 8 and FIG. 9.

FIG. 8 is a diagram illustrating an example of a content management DB according to the first embodiment. The content management DB 350 in the first embodiment includes "USER ID", "CONTENT DATA", "DISPLAY TIME PERIOD", and "STATUS" as items of information. In the content management DB 350, the item "USER ID" are associated with other items. In the following description, in the user DB 360, information including a value of the item "USER ID" and values of other items is called content management information. That is, the content management DB 350 in the present embodiment performs a function as a content management part that stores the content management information.

The item "USER ID" indicates information to identify the user of the dedicated terminal. A value of the item "CONTENT DATA" indicates data stored in a state capable of being displayed on the electronic blackboard 200.

A value of the item "DISPLAY TIME PERIOD" corresponds to information stored together when the content data are stored in the user DB 360, and indicates a time period during which corresponding content data are to be displayed on the electronic blackboard 200. A value of the item "STATUS" indicates a status of the corresponding content data.

For example, in FIG. 8, the user ID "101" is associated with the content data "oox.pdf", and the user ID "101" is associated with the card ID "xxxxx". In addition, the time period, in which the content data "ooox.pdf" are scheduled to be displayed on the electronic blackboard 200 is 14:00 to 15:00, indicating that the content data "ooox.pdf" are not currently displayed on the electronic blackboard 200.

In FIG. 8, the user IDs "101" and "102" are associated with the content data "ooox .pdf", and the time period, in which the content data "ooox .pdf" are scheduled to be displayed on the electronic blackboard 200, is 10:00 to 11:30. The content data "xx.pdf" is currently displayed on the electronic blackboard 200.

The items of information included in the content management DB 350 are not limited to those illustrated in FIG. 8; however, the content management DB 350 may include one or more items other than those illustrated in FIG. 8. Specifically, for example, the content management DB 350 may store the terminal ID of the electronic blackboard 200 for specifying the electronic blackboard 200, which displays the content data.

FIG. 9 is a diagram illustrating an example of the user DB in the first embodiment. The user DB 360 in the first embodiment includes "USER ID" and "CARD ID" as items of information, and both are associated with each other. In the example illustrated in FIG. 9, one example of the identification information of the dedicated terminal is the card ID. In the example of FIG. 9, the user ID "101" is associated with the card ID "xxxxx". That is, the user DB 360 in the first embodiment performs a function as a user management part that stores the card ID, which is the identification information of the dedicated terminal, in association with the user information for identifying the user who uses the electronic blackboard 200.

In the example of FIG. 9, the items of information contained in the user DB 360 are the user ID and the card ID; however, the user DB 360 is not limited to this data structure. The user DB 360 may include items other than those illustrated in FIG. 9.

Next, an operation of the electronic blackboard system 100 in the first embodiment will be described with reference to FIG. 10. FIG. 10 is a sequence diagram illustrating the operation of the electronic blackboard system in the first embodiment.

In the electronic blackboard system 100 in the first embodiment, the display control part 24 of the electronic blackboard 200 causes the display device 220 to display a login screen (step S1001). Subsequently, the electronic blackboard 200 acquires the card ID from the IC card 3 by the acquisition providing part 28 (step S1002).

Subsequently, the electronic blackboard 200 sends the received card ID to the server apparatus 300 by the transceiving part 21 (step S1003). In other words, the electronic blackboard 200 requests an authentication of a user of the IC card 3 by sending the card ID to the server apparatus 300.

When the server apparatus 300 receives the card ID by the transceiving part 371, the authentication part 372 performs authentication of the user of the IC card 3 by referring to the user DB 360 (step S1004). In other words, the authentication part 372 determines whether or not the received card ID is associated with the user ID in the user DB 360.

Subsequently, the server apparatus 300 sends an authentication result by the authentication part 372 to the electronic blackboard 200 by the transceiving part 371 (step S1005). Specifically, the server apparatus 300 may send the user ID to the electronic blackboard 200 as the authentication result. FIG. 10 illustrates an example in which the authentication is successful. However, when the authentication is failed, the server apparatus 300 sends a notification indicating that the authentication is failed, to the electronic blackboard 200.

When the authentication is successful, the electronic blackboard 200 performs a process based on the authentication result (step S1006). Specifically, when a notification indicating that authentication is successful is received from the server apparatus 300 by the transceiving part 21, the electronic blackboard 200 may display a screen that can be manually input by a user on the display device 220 by the display control part 24.

When receiving a notification indicating that the authentication has failed, the electronic blackboard 200 may display a message or the like indicating that the authentication has failed on the display device 220.

When authentication is successful, the server apparatus 300 searches the content management DB 350 by using a user ID corresponding to the received card ID and a time when the card ID is received, as keys by the content management part 373 (step S1007).

The content management part 373 determines whether or not the content management information, of which a user ID matches a user ID corresponding to the card ID and of which the display time period includes a time when the card ID is received, exists in the content management DB 350.

Subsequently, the server apparatus 300 sends a notification indicating a search result acquired by the content management part 373 to the electronic blackboard 200 through the transceiving part 371 (step S1008). FIG. 10 illustrates a case in which the corresponding content management information is stored in the content management DB 350.

When the electronic blackboard 200 receives this notification from the transceiving part 21, the display control part 24 displays, on the display device 220, a notification screen for notifying that the content data to be displayed exist (step S1009).

At this time, the electronic blackboard 200 may display a message or the like indicating that the content data to be displayed is shared by a plurality of users. In other words, the electronic blackboard 200 may display a message indicating that there is another user who is allowed to display the content data, which is scheduled to be displayed on the electronic blackboard 200, in addition to the user authenticated in step S1004.

Subsequently, when the receiving part 22 receives a display instruction of the content data scheduled to be displayed, the electronic blackboard 200 sends an acquisition request for acquiring the content data to the server apparatus 300 through the transceiving part 21 (step S1010).

When receiving the acquisition request, the server apparatus 300 reads out content data from the content management DB 350 (step S1011), and sends the read-out content data through the transceiving part 371 (step S1012).

When the electronic blackboard 200 receives the content data by the transceiving part 21, the display control part 24 displays the received content data on the display device 220 (step S1013).

In the following, an example of a login screen to be displayed on the electronic blackboard 200 in the first embodiment will be described with reference to FIG. 11.

Figure 11A:
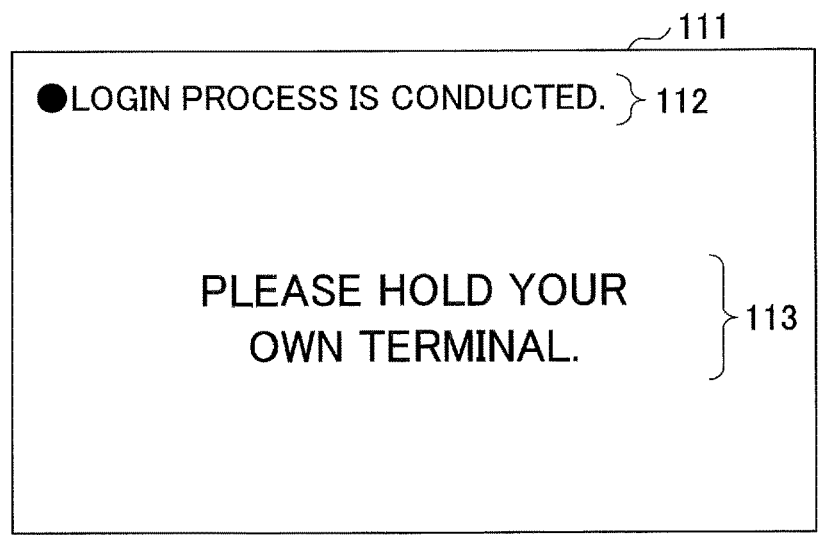
FIG. 11A is a diagram illustrating an example of a login screen.
Figure 11B:
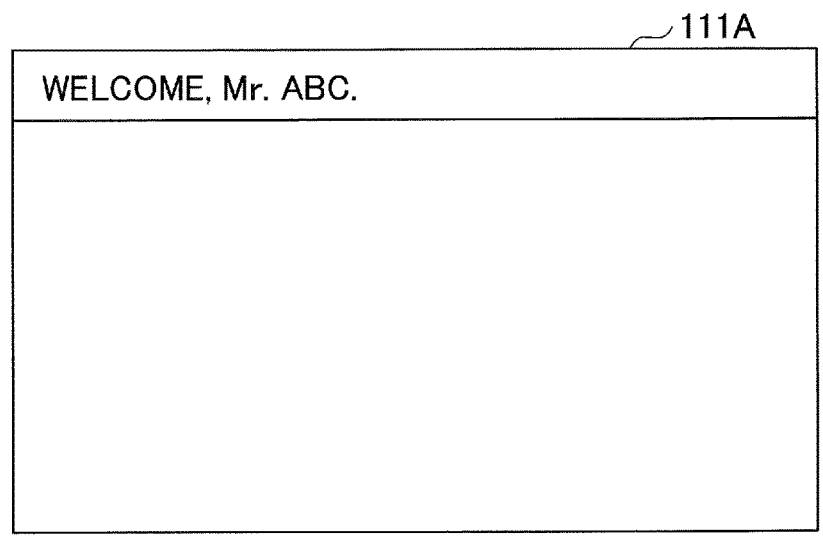
FIG. 11B is a diagram illustrating an example of a screen displayed when an authentication is successful.
Figure 11C:
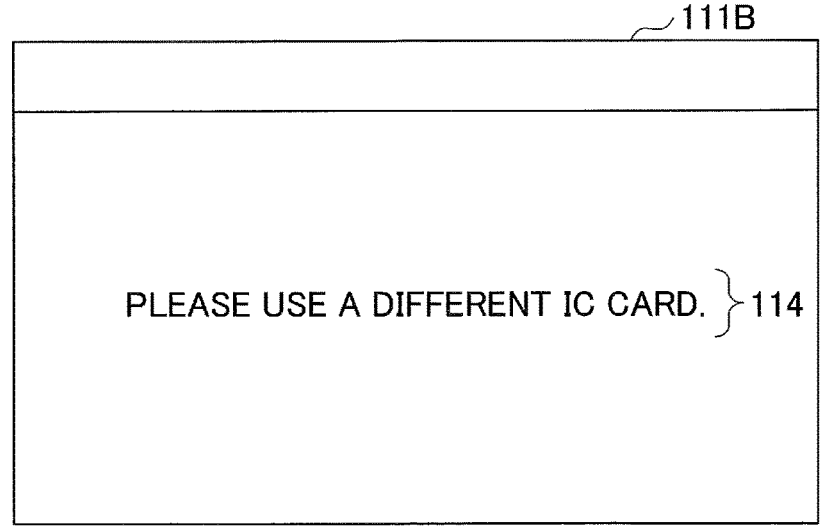
FIG. 11C is a diagram illustrating an example of a screen displayed when the authentication fails.

FIG. 11A, FIG. 11B, and FIG. 11C are diagrams illustrating examples of the login screen in the electronic blackboard in the first embodiment. FIG. 11A illustrates an example of the login screen, FIG. 11B illustrates an example of a screen displayed when the authentication is successful, and FIG. 11C illustrates an example of a screen displayed when the authentication fails.

A screen 111 illustrated in FIG. 11A displays a message 112 indicating that a login process needs to be executed and a message 113 indicating that the user is prompted to execute the dedicated terminal. In the first embodiment, the identification information is read from the dedicated terminal in the authentication of the user; however, a timing of reading the identification information is not limited to this example. For example, according to the first embodiment, the user ID and a password may be input to the electronic blackboard 200 to perform a user authentication.

When the acquisition providing part 28 acquires the identification information of the dedicated terminal and the authentication of the user is successful, the acquisition providing part 28 causes the display control part 24 move the screen 111 to a screen 111A illustrated in FIG. 11B. The screen 111A is a screen, on which the user is able to manually enter data.

When the user authentication fails, the display control part 24 moves the screen 111 to a screen 111B illustrated in FIG. 11C. The screen 111B displays a message 114 indicating that the authentication has failed.

Next, an example of a notification screen for notifying an existence of the content data to be displayed will be described with reference to FIG. 12.

Figure 12:
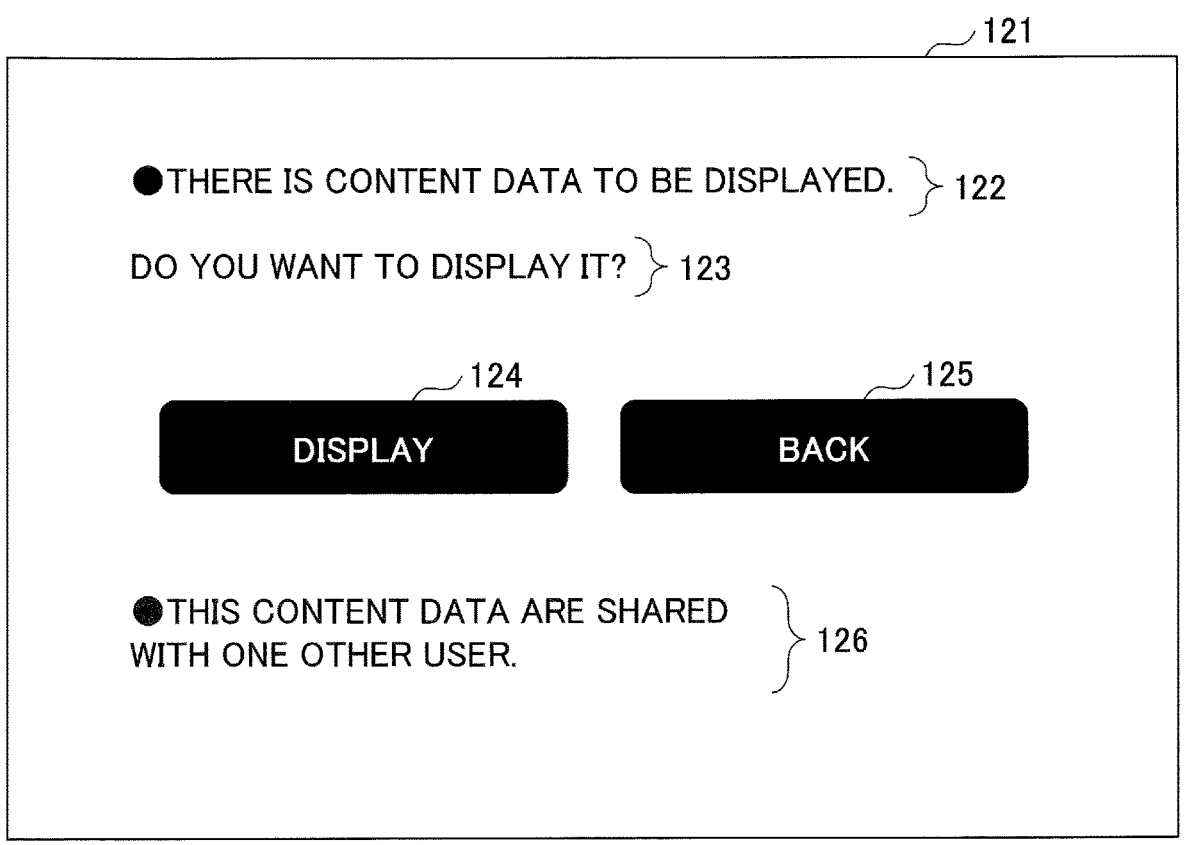
FIG. 12 is a diagram illustrating an example of a notification screen in the electronic blackboard in the first embodiment.

FIG. 12 is a diagram illustrating an example of a notification screen in the electronic blackboard in the first embodiment. A screen 121 illustrated in FIG. 12 displays a message 122 notifying that the content data scheduled to be displayed exist at a time period when the user logged in, and a message 123 inquiring whether or not the content data are to be displayed.

Further, a button 124 for instructing to display the content data, which is scheduled to display, a button 125 for moving from the screen 121 to the original screen, and a message 126 indicating that the content data to be displayed are shared with a plurality of users are displayed on the screen 121.

In the first embodiment, when the button 124 is manipulated, the electronic blackboard 200 sends an acquisition request for acquiring the content data to be displayed, to the server apparatus 300.

In this manner, according to the first embodiment, it is possible for the user of the electronic blackboard 200 to display content data desired by the user on the display device 220 by simply holding the dedicated terminal over the electronic blackboard 200. Hence, according to the first embodiment, after the user holds the dedicated terminal over the electronic blackboard 200, the user do not deed to conduct complicated operations, such as searching for and selecting a content to display from a list of a large number of content data are not required.

The content data desired by the user are stored in the content management DB 350 as the content management information in advance by the user. The user, who registered the content data in the content management DB 350, stores information of other users in advance to share the content data.

In this case, the content management information may be created, for example, by a computer connected to the server apparatus 300, and may be stored in the content management DB 350.

For example, the content data, which are created when the user previously used the electronic blackboard 200 or other electronic blackboards, are sent to the server apparatus 300, and stores as the content management information in the content management part 373.

As described above, according to the first embodiment, it is possible for the user to easily display the desired data on the electronic blackboard 200.

Second Embodiment

A second embodiment will be described with reference to the drawings. Different from the first embodiment, the second embodiment assumes a case in which a meeting room is reserved using an electronic blackboard. Accordingly, in the description of the second embodiment below, only differences from the first embodiment are explained, and parts functionally similar to those in the first embodiment are given the same numerals as those used in the description of the first embodiment, and explanations thereof will be omitted.

Figure 13:
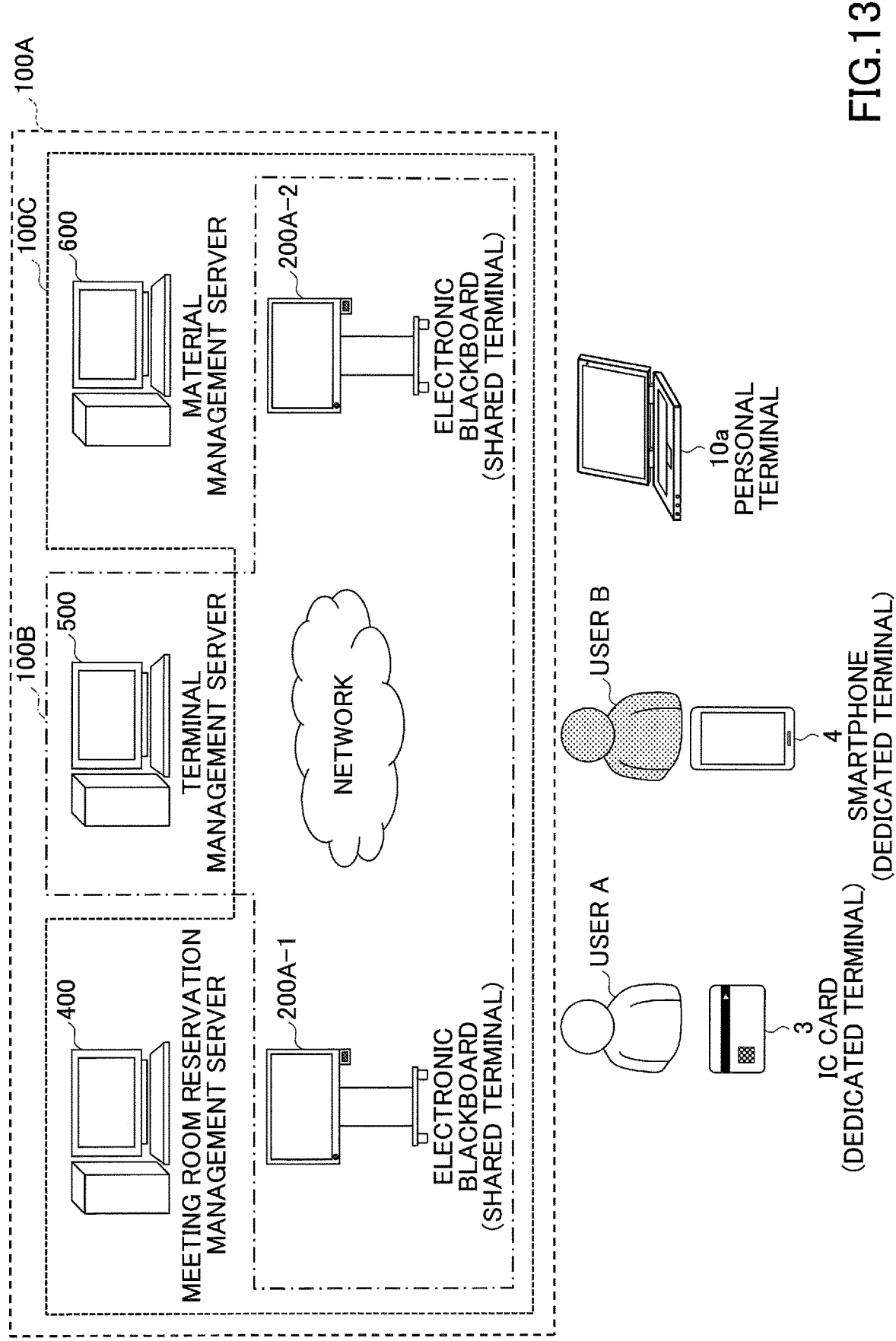
FIG. 13 is a diagram illustrating an example of a system configuration of an electronic blackboard system in the second embodiment.

FIG. 13 is a diagram illustrating an example of a system configuration of an electronic blackboard system in the second embodiment. An electronic blackboard system 100A in the second embodiment includes the electronic blackboards 200A-1, 200A-2, a meeting room reservation management server 400, a terminal management server 500, and a material management server 600.

Incidentally, in the example of FIG. 13, the electronic blackboard system 100A includes two electronic blackboards: the electronic blackboards 200A-1 and 200A-2; however, a number of electronic blackboards is not limited to this configuration. The number of the electronic blackboards 200A included in the electronic blackboard system 100A may be any number of electronic blackboards. In the following description, in a case in which the electronic blackboards 200A-1 and 200A-2 are not distinguished, these are simply called the electronic blackboard 200A.

The electronic blackboard system 100A in the second embodiment is installed, for example, in a company having a plurality of meeting rooms, in which the electronic blackboard 200A is arranged. In the second embodiment, for example, it is assumed that a meeting held in a meeting room, in which the electronic blackboard 200A-1 is installed, is prolonged, a time spent for reserving the meeting room is exceeded, and thus, attendees move to the electronic blackboard 200A-2 in order to continue the meeting.

In this case, in the second embodiment, when a user participated in a meeting holds the dedicated terminal over the electronic blackboard 200A-2 arranged in a meeting room to which the user moves, the content data, which was displayed on the electronic blackboard 200A-1 (first electronic blackboard), is displayed on the electronic blackboard 200A-2 (second electronic blackboard).

The meeting room reservation management server 400 (third information processing system) in the second embodiment manages information concerning a reservation of a meeting room for each user. The terminal management server 500 (second information processing system) in the second embodiment manages the dedicated terminal and a user ID of the user in association with each other. In other words, the terminal management server 500 has the user DB 360.

The material management server 600 (the first information processing system) manages content data to be displayed on the electronic blackboard 200A. In other words, the material management server 600 includes a database corresponding to the content management DB 350.

Further, in the electronic blackboard system 100A in the second embodiment, a meeting room is reserved or the like by a personal terminal 10*a* connected to the electronic blackboard system 100A via a network. The personal terminal 10*a* may create the content data managed by the material management server 600.

As described above, the electronic blackboard system 100A in the second embodiment can be regarded as a meeting system including an electronic blackboard system 100B including the electronic blackboard 200A and the terminal management server 500, and the meeting management system 100C including the electronic blackboard 200A, the meeting room reservation management server 400, and the material management server 600.

The meeting room reservation management server 400, the terminal management server 500, the material management server 600, and the personal terminal 10a are general computers, and because hardware configurations thereof are the same as those of the server apparatus 300 in the first embodiment, explanations thereof will be omitted.

As described above, a plurality of servers may be used to configure the system, and any of the servers may be provided with functions. A system configuration, in which a terminal and a server are connected in the second embodiment, is an example, and any one of various system configurations depending on the application and the purpose may be applied.

Next, a function of each of apparatuses of the electronic blackboard system 100A in the second embodiment will be described with reference to FIG. 14.

Figure 14:
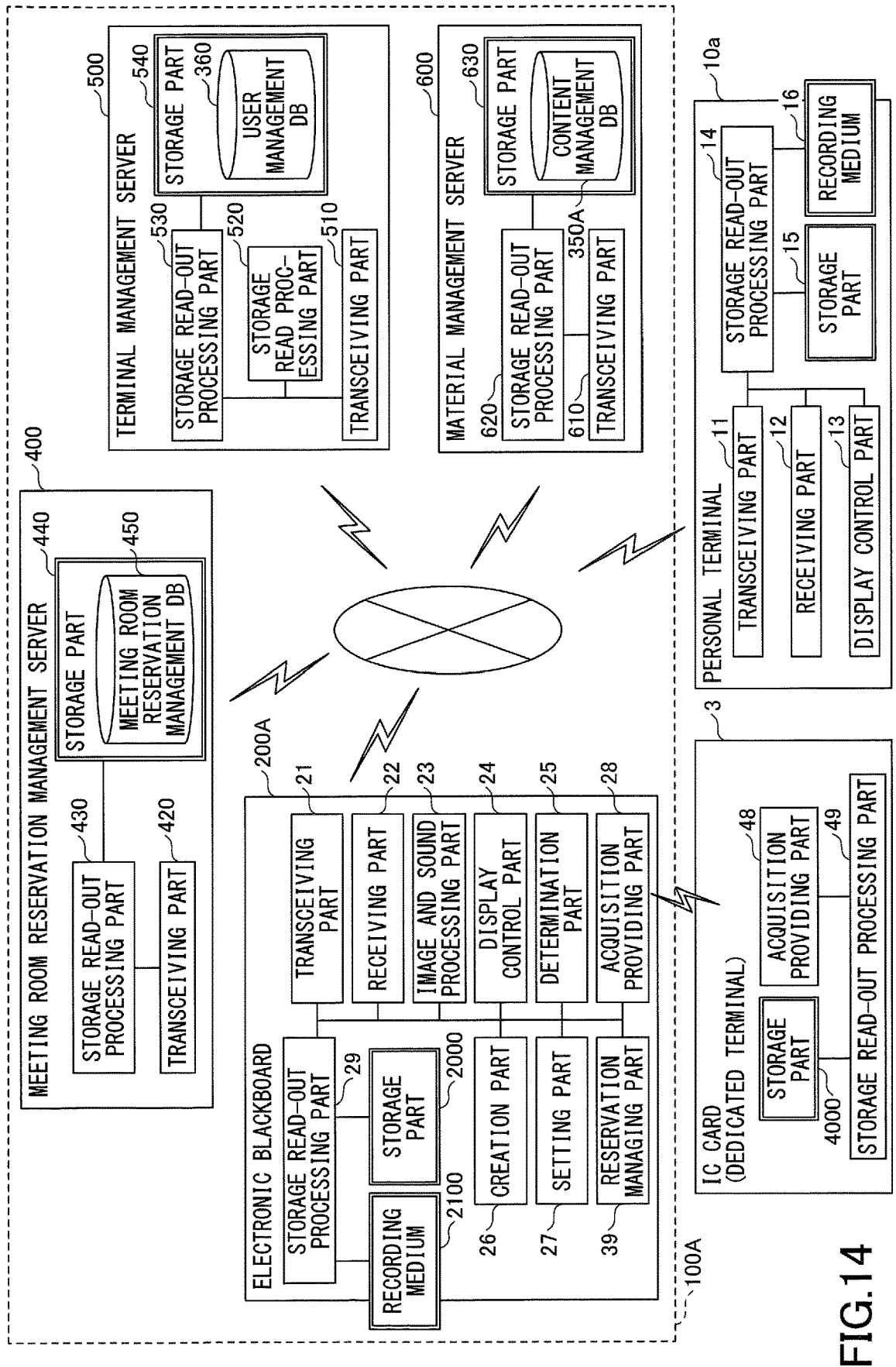
FIG. 14 is a diagram illustrating a function of each of apparatuses included in the electronic blackboard system in the second embodiment.

FIG. 14 is a diagram illustrating a function of each of apparatuses included in the electronic blackboard system in the second embodiment.

First, the function of the electronic blackboard 200A in the second embodiment will be described. The electronic blackboard 200A in the second embodiment includes a transceiving part 21, a receiving part 22, an image and sound processing part 23, a display control part 24, a determination part 25, a creation part 26, a setting part 27, an acquisition providing part 28, a storage read-out processing part 29, and a reservation managing part 39.

The reservation managing part 39 in the second embodiment manages the reservation of the meeting room in which the electronic blackboard 200A is installed.

Specifically, when a user acquires identification information from the dedicated terminal, the reservation managing part 39 sends a notification indicating that the use of the electronic blackboard 200A has started, to the meeting room reservation management server 400 by the transceiving part 21. That is, the electronic blackboard 200A sends information indicating that the user has started using the electronic blackboard 200A, to the meeting room reservation management server 400 as a notification indicating that a meeting has started in the meeting room in which the electronic blackboard 200A is located.

The reservation managing part 39 may determine whether or not a time becomes a predetermined time before the time when the reservation in the meeting room, in which the dedicated terminal is located, is over, and at the predetermined time, the display control part 24 may display, on the display device 220, a message notifying that the reservation will be over.

The reservation managing part 39 may send a notification indicating that the user has completed using the electronic blackboard 200A, to the meeting room reservation management server 400 as a notification indicating that the meeting in the meeting room, in which the electronic blackboard 200A is arranged, has ended.

In addition, the reservation managing part 39 may reserve a meeting room. Specifically, for example, in a case in which the meeting is prolonged and the reservation of the meeting room needs to be extended, in a case in which attendees need to move another available meeting room, or the like, the reservation managing part 39 conducts a re-reservation with respect to a current meeting room. In other words, when the reservation managing part 39 receives information regarding the reservation of the meeting room, the reservation managing part 39 sends information to the meeting room reservation management server 400 corresponding the information to the user ID, of which the user currently logged in.

The meeting room reservation management server 400 in the second embodiment includes a transceiving part 420, a storage read-out processing part 430, and a storage part 440. Each of these parts is realized by the CPU reading out and executing a meeting room reservation management program deployed in the RAM from the HD in the meeting room reservation management server 400.

The transceiving part 420 sends various types of sets of data (or information items) to and from other devices included in the electronic blackboard system 100A through the network. The storage read-out processing part 430 performs a process for storing various sets of data in the storage part 440 and for reading out various sets of data stored in the storage part 440.

Specifically, a storage read-out processing part 430 updates a meeting room reservation management DB 450 based on a notification upon receiving, for example, a notification indicating that a meeting has started or a notification indicating that the meeting has ended, from the electronic blackboard 200A.

The meeting room reservation management DB 450 is stored in the storage part 440. The meeting room reservation management DB 450 stores information pertinent to the reservation of the meeting room. Details of the meeting room reservation management DB 450 will be described below.

The terminal management server 500 includes a transceiving part 510, a storage read processing part 520, and a storage part 530. Each of these parts is realized when the CPU reads out and executes a terminal management program developed in the RAM from the HD in the terminal management server 500.

The transceiving part 510 sends various types of sets of data (or information items) to and from other apparatus included in the electronic blackboard system 100A through the network. The storage read processing part 520 performs a process for storing various sets of data in the storage part 530 and for a process for reading out various sets of data stored in the storage part 530. The user DB 360 is stored in a storage part 540.

The material management server 600 in the second embodiment includes a transceiving part 610, a storage read-out processing part 620, and a storage part 630. Each of these parts is realized by reading out and executing a document management program deployed in the RAM from the HD in the material management server 600 to the RAM.

The transceiving part 610 sends various types of sets of data (or information items) to and from other apparatuses included in the electronic blackboard system 100A through the network. The storage read-out processing part 620 performs a process for storing various data in the storage part 630 and a process for reading out various data stored in the storage part 630.

A content management DB 350A is stored in the storage part 630. Details of the content management DB 350A will be described below.

Next, a function of the personal terminal 10a in the second embodiment will be described. The personal terminal 10a includes a transceiving part 11, a receiving part 12, a display control part 13, a storage read-out processing part 14, and a storage part 15.

The transceiving part 11 sends various types of sets of data (or information items) to and from another apparatus included in the electronic blackboard system 100A through the network. The receiving part 12 receives inputs of various information items to the personal terminal 10a.

The display control part 13 controls a display part of the personal terminal 10a. The storage read-out processing part 14 performs a process for storing various data in the storage part 15 and a process for reading out various sets of data stored in the storage part 15 or a recording medium 16.

In the second embodiment, for example, a meeting room may be reserved by the personal terminal 10a. Specifically, for example, the personal terminal 10a displays a reservation screen for reserving a meeting room on the display part by the display control part 13, and receives an input such as a selection of the meeting room and a scheduled use time (reservation time) of the meeting room by the receiving part 12. The personal terminal 10a may send input information to the meeting room reservation management server 400 by the transceiving part 11.

Figure 15A:
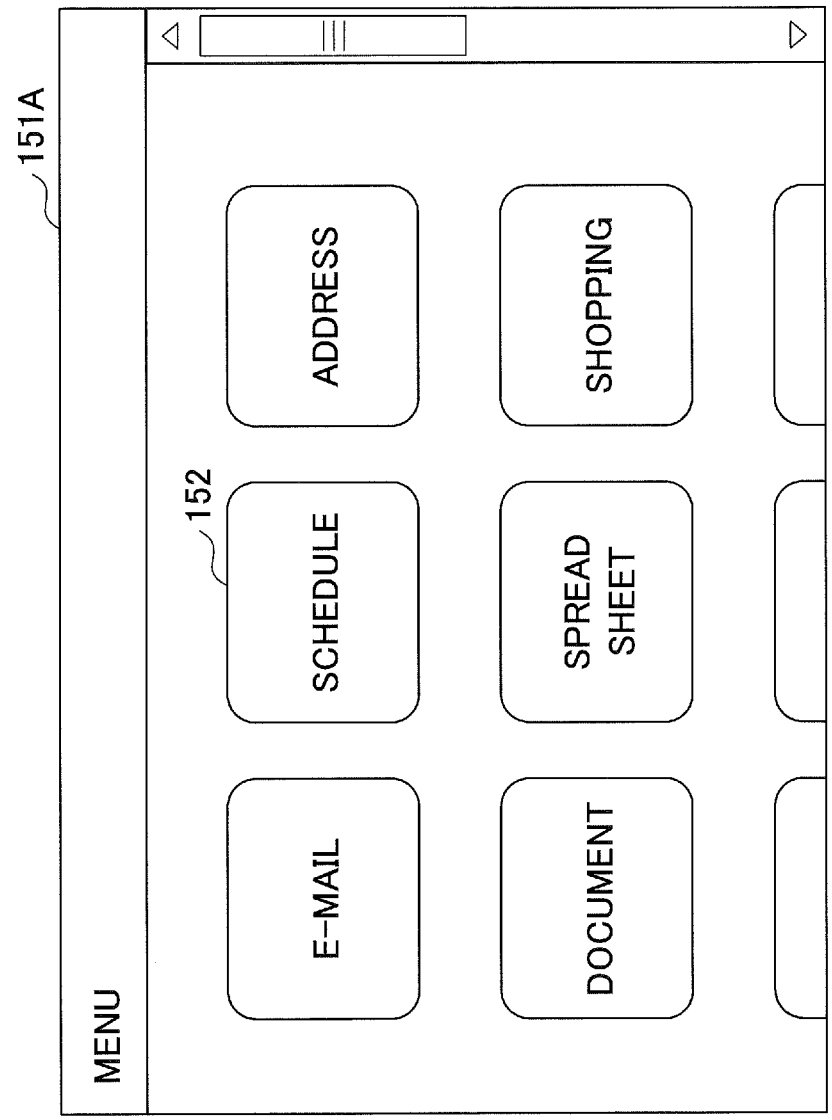
FIG. 15A is a diagram illustrating an example of a menu screen displayed on the personal terminal.

Hereinafter, the reservation of the meeting room by the personal terminal 10a will be described with reference to FIG. 15A and FIG. 15B. In FIG. 15A and FIG. 15B, the reservation of the meeting room by the personal terminal will be described. FIG. 15A illustrates an example of a menu screen displayed on the personal terminal 10a, and FIG. 15B illustrates an example of a schedule table displayed on the personal terminal 10a.

The personal terminal 10a in the second embodiment is, for example, a terminal personally used by a user. A menu screen 151A illustrated in FIG. 15A displays a list of icons corresponding to various services available for the user of the personal terminal 10a to receive through the personal terminal 10a and icons corresponding to various applications executed by the personal terminal 10a.

When an icon 152 corresponding to a schedule table is selected in the menu screen 151A, the personal terminal 10a transits the menu screen 151A to a screen 151B.

In the screen 151B, a calendar may be displayed, and a schedule setting of the user of the personal terminal 10a, a confirmation and modification of a schedule previously set may be performed.

In the second embodiment, for example, when an available meeting room is selected and a scheduled time period for use is input on the screen 151B, the selected meeting room and the entered time period are sent to the meeting room reservation management server 400 together with the user ID of the user of the personal terminal 10a.

At this time, a calendar already set as the schedule may be displayed on the screen 151B by another user other than the user of the personal terminal 10a. Other users may be, for example, users whose share the schedule with the user of the personal terminal 10a. In addition, other users may be users who attend the same meeting as the user of the personal terminal 10a attends.

In the example of FIG. 15B, in a case in which the user ID "101" is assigned to the user of the personal terminal 10a, with a calendar of the user ID "101", calendars of the user ID "102" and the user ID "103" are displayed. Accordingly, it is possible for the user of the personal terminal 10a to confirm that the schedule is shared with users of the user ID "102" and the user ID "103".

Also, in the example of FIG. 15B, it is possible for the user of the personal terminal 10a to confirm that a user of the user ID "102" is scheduled with the user of the personal terminal 10a to attend a meeting held in the meeting room A at 10:00-11:00 on January 30.

Upon receiving information indicating the meeting room, the time period, and the user ID from the personal terminal 10a, the meeting room reservation management server 400 stores the information in the meeting room reservation management DB 450.

Next, the meeting room reservation management DB 450 of the meeting room reservation management server 400 will be described with reference to FIG. 16A and FIG. 16B.

FIG. 16A and FIG. 16B are diagrams illustrating examples of a meeting room reservation management DB in the second embodiment. FIG. 16A illustrates an example of a meeting room reservation management DB 450-1 in a state in which a plurality of meeting rooms are reserved, and FIG. 16B illustrates an example of a meeting room reservation management DB 450-2 in a state in which a scheduled meeting room is in use. In a case of not specifying one of the meeting room reservation management DB 450-1 or 450-2, they may simply referred to as the meeting room reservation management DB 450.

The meeting room reservation management DB 450 in the second embodiment includes "DATE OF USE", "FLOOR", "MEETING ROOM NAME", "START TIME", "END TIME", "USER ID", and "STATUS" as items of information.

A value of the item "DATE OF USE" indicates the date of use of the meeting room. A value of the item "FLOOR" indicates a floor number in the building where the meeting room is located. A value of the item "MEETING ROOM NAME" indicates a name of the meeting room. In the meeting room reservation management DB 450, information containing values for each item is called reservation management information.

A value of the item "START TIME" indicates a time to start using the meeting room. In other words, the value of the item "START TIME" indicates a time, at which the meeting room is started to use. A value of the "END TIME" indicates a time, at which the meeting room is ended to use. A value of the item "STATUS" indicates a status of the meeting room. If the value of the item "STATUS" indicates 'reserved', the corresponding meeting room is reserved but not yet in use. If the value of the item "STATUS" indicates 'in use', the corresponding meeting room is in use.

In the meeting room reservation management DB 450-1 illustrated in FIG. 16A, the meeting room A is reserved by the users specified by the user IDs "101" and "102" from 10:00:00 to 11:00 on Jan. 30, 2018, and the meeting in the meeting room A has not yet started.

In the meeting room reservation management DB 450-2 illustrated in FIG. 16B, the start time of the meeting room A is 10:02 on Jan. 30, 2018, and the status of the meeting room A is in use. Accordingly, it is understood that the users of the user ID "101" or the user ID "102" held respective dedicated terminals over the electronic blackboard 200A installed in the meeting room A and started using the meeting room A at 10:02.

Next, the content management DB 350A prepared in the material management server 600 in the second embodiment will be described with reference to FIG. 17. FIG. 17 is a diagram illustrating the content management DB in the second embodiment.

The content management information stored in the content management DB 350A in the second embodiment is generated in relation with the electronic blackboard 200A upon reserving the meeting room.

The content management DB 350A in the second embodiment includes "USER ID", "CONTENT DATA", "MOVE-TO MEETING ROOM NAME", and "RESERVATION TIME" as items of information.

A value of the item "USER ID" indicates identification information for identifying one or more users who are to share the content data in the meeting room indicated by the name of a move-to meeting room, to which the users move in order to continue their meeting. The item "USER ID" includes the identification information read from the dedicated terminal by the electronic blackboard 200A and the corresponding the user ID.

A value of the item "CONTENT DATA" is the content data displayed on any one of the electronic blackboards 200A included in the electronic blackboard system 100A.

A value of the item "MOVE-TO MEETING ROOM NAME" is a name of the meeting room, to which the users move from a current meeting room. In the second embodiment, in a case in which the time of the meeting will be longer than the scheduled time, when the meeting room is available even after the reserved time ends, the name of the meeting room, which has been currently used, may be a value of the item "MOVE-TO MEETING ROOM NAME".

In the example of FIG. 17, the user IDs "101" and "102", and the content data "WB20180125-101531.pdf" are associated with the move-to meeting room name "B" at 11:00 to 12:00. Accordingly, it is possible to understand that the content data "WB20180125-101531.pdf" is scheduled to be displayed by the user of the user ID "101" or the user ID "102" in the meeting room B at 11:00 to 12:00.

In the content management DB 350A, an item "TERMINAL ID" may be provided instead of an item "move-to meeting room name". A value of the item "TERMINAL ID" is unique identification information of the electronic blackboard 200A, and thus, is used to specify each of the electronic blackboards 200A. A value of the item "RESERVED TIME" indicates the time period, during which the meeting room to be moved is reserved. In other words, a value of the item "RESERVATION TIME" indicates the time period during which the electronic blackboard 200A is expected to be used in the meeting room, to which the users move. That is, the value of the item "RESERVATION TIME" is the time period during which the corresponding content data is displayed on the electronic blackboard 200A at the destination.

The content management DB 350A in the second embodiment may store the content management information registered in advance upon reserving the meeting room from the personal terminal 10a or the like. The meeting room reservation management server 400 may temporarily retain the content management DB 350, in which the content management information registered by the personal terminal 10a or the like is stored, from a time when the meeting room is reserved by the personal terminal 10a to a time when the meeting is started.

Next, an operation of the electronic blackboard system 100A in the second embodiment will be described with reference to FIG. 18A, FIG. 18B, FIG. 19A, FIG. 19B, and FIG. 19C.

In the following, with reference to FIG. 18, an operation will be described in a case of continuously using a meeting room currently used by extending a time of the meeting. Moreover, with reference to FIG. 19, an operation in which, will be described in a case of extending the time of the meeting, the meeting is performed using an electronic blackboard 200A disposed in another meeting room which is moved from a conventionally used meeting room to another meeting room.

Figure 18B:
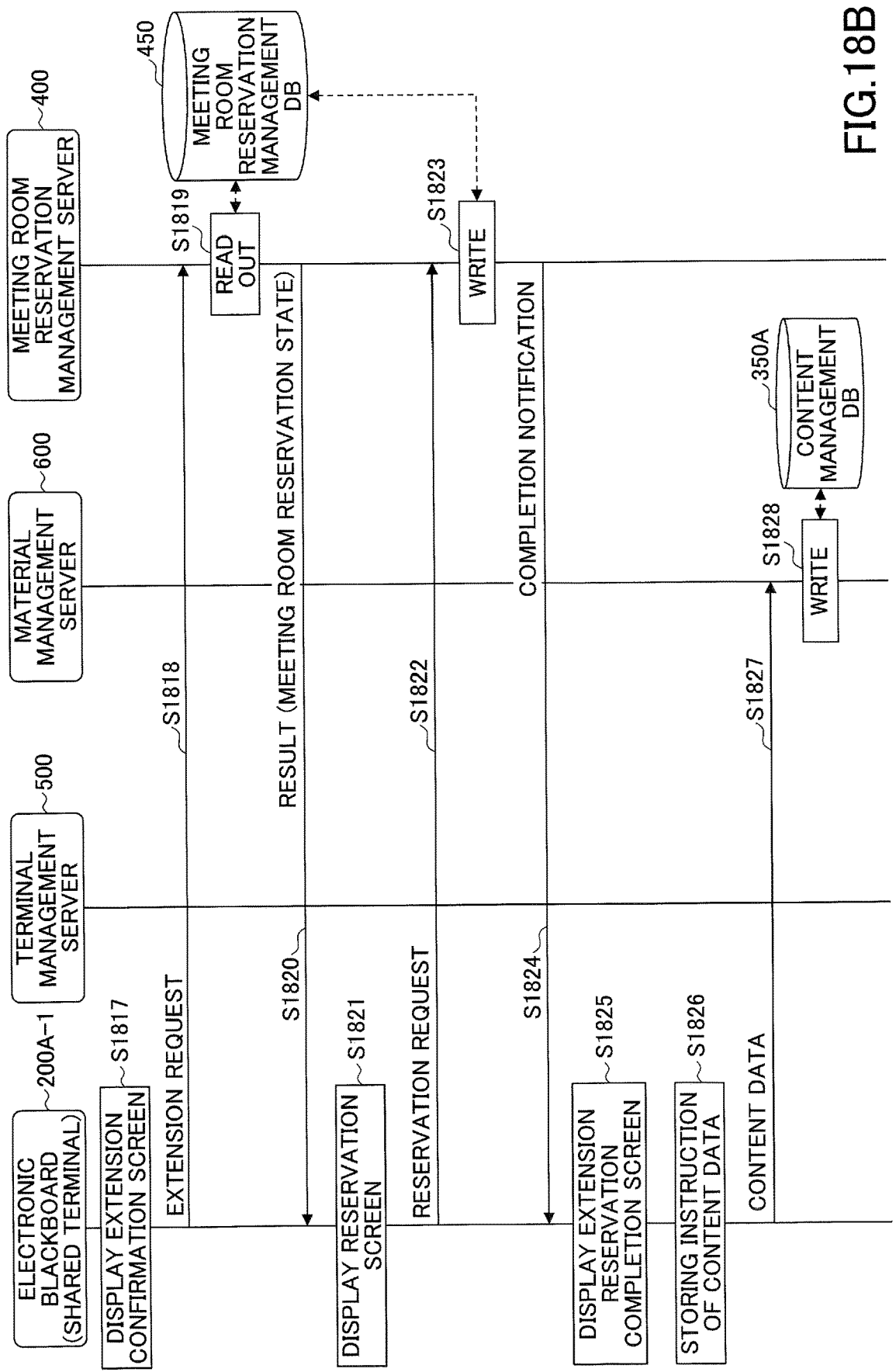

A first sequence for an operation of the electronic blackboard system in the second embodiment will be described. FIG. 18A and FIG. 18B illustrate a case in which the meeting held in the meeting room, in which the electronic blackboard 200A-1 is installed, is extended in the same meeting room.

Because processes between the electronic blackboard 200A-1 and the terminal management server 500 from step S1801 to step S1806 in FIG. 18A are the same as processes between the electronic blackboard 200 and the server apparatus 300 from step S1001 to step S1006 in FIG. 10, explanations thereof will be omitted.

Following step S1806 in FIG. 18A, the reservation managing part 39 of the electronic blackboard 200A-1 sends a start-of-use notification indicating that use of the electronic blackboard 200A-1 has started, to the meeting room reservation management server 400 by the transceiving part 21 (step S1807). The start-of-use notification may include a user ID obtained in the authentication at the electronic blackboard 200A and information indicating a time when the card ID was acquired.

Upon receiving this notification at the meeting room reservation management server 400, the storage read-out processing part 430 specifies, from the meeting room reservation management DB 450, meeting room management information, of which user ID matches user ID included in the start-of-use notification and of which time is between a start time and an end time. Then, the time when the card ID was acquired is written as a value of the item "START TIME" included in the specified meeting room management information, and a value 'in use' is written as a value of the item "STATUS" (step S1808).

The reservation managing part 39 of the electronic blackboard 200A-1 sends a search request of content data to the material management server 600 by the transceiving part 21 (step S1809). The search request includes the user ID included in the use start notification, and information indicating the time when the card ID was acquired.

Upon receiving this notification at the material management server 600, the content management DB 350A is searched for by the storage read-out processing part 620 (Step S1810), and the search result is sent to the electronic blackboard 200A-1 (step S1811).

Specifically, the material management server 600 determines whether or not the content management DB 350A includes the content management information, which matches the user ID, and of which the reservation time includes the time when the card ID is acquired, and notifies the electronic blackboard 200A-1 of a determination result. In this process, the notification in step S1811 is assumed as a notification indicating that the content management information exists.

Upon receiving this notification, the electronic blackboard 200A-1 causes the display control part 24 to display, on the display device 220, a screen for notifying that content data to be displayed exists (step S1812).

When an operation to instruct to display the content data is performed in this screen, the electronic blackboard 200A-1 sends the acquisition request of the content data to the material management server 600 by the transceiving part 21 (step S1813).

The material management server 600 accepts an acquisition request and reads out the content data included in the content management information, which has been retrieved in step S1810 from the content management DB 350A (step S1814). The material management server 600 sends the read-out content data to the electronic blackboard 200A-1 (step S1815).

The electronic blackboard 200A-1 displays the content data received from the material management server 600 on the display device 220 by the display control part (step S1816).

Referring to FIG. 18B, the electronic blackboard 200A-1 displays an extension confirmation screen on the display device 220 by the display control part 24 to inquire whether or not to extend the scheduled time, when the reservation managing part 39 determines that an end of the scheduled time is approaching (step S1817).

When the electronic blackboard 200A-1 receives an operation to instruct an extension in the extension confirmation screen, the transceiving part 21 sends an extension request to the meeting room reservation management server 400 (step S1818).

When receiving an extension request, the meeting room reservation management server 400 reads the reservation management information for the meeting room where the electronic blackboard 200A-1 is installed, by referring to the meeting room reservation management DB 450 (step S1819). The meeting room reservation management server 400 sends information indicating a reservation status of the meeting room where the electronic blackboard 200A-1 is installed to the electronic blackboard 200A-1 (step S1820).

The electronic blackboard 200A-1 displays a reservation screen on the display device 220 for reserving the meeting room upon receiving information indicating the availability (step S1821). When the electronic blackboard 200A-1 receives an operation to instruct a reservation of the meeting room on the reservation screen, the transceiving part 21 sends a reservation request of the meeting room to the meeting room reservation management server 400 (step S1822).

The meeting room reservation management server 400 receives the reservation request, newly generates the meeting room management information indicating the user ID and the meeting room name, and writes the meeting room management information in the meeting room reservation management DB 450 (step S1823). At this time, the time from the start time to the end time of the meeting room may be regarded as a time indicated in advance in the generated meeting room management information. In other words, if the meeting room is to be extended, a time amount capable of being extended may be predefined.

When the writing is completed, the meeting room reservation management server 400 sends, to the electronic blackboard 200A-1, a completion notification indicating that the reservation is completed (step S1824).

The electronic blackboard 200A-1 displays, on the display device 220, an extension reservation completion screen indicating that a reservation for an extension of the meeting room has been completed, upon receiving the completion notification (step S1825).

Subsequently, the electronic blackboard 200A-1 receives an operation, which instructs storing of the content data (step S1826). Subsequently, the electronic blackboard 200A-1 sends the content data to the material management server 600 (step S1827). At this time, the electronic blackboard 200A-1 sends, to the material management server 600, the content data by associating the user ID acquired as the authentication result, the user ID included in the content management information retrieved in step S1810, and the extension time of the meeting room in association with each other with the content data. That is, in this case, the content data are associated with a plurality of user IDs that identify users who share the content data before extension.

The content data sent to the material management server 600 include a handwritten stroke image or the like input at the electronic blackboard 200A-1 from an acquiring of the card ID until the operation made to instruct a storing of the card ID is received.

When receiving the content data, the material management server 600 stores the content data by associating with the user ID, the meeting room name, and the extension time (reservation time) of the meeting room, to the content management DB 350A (step S1828).

That is, the user of the electronic blackboard 200A-1 checks whether or not the meeting room currently in use for the meeting is available to be in use over the reservation time. In a case in which the meeting room is available to be in use over the reservation time, the reservation time is extended in order to continuously use the meeting room currently in use.

In the example illustrated in FIG. 18A and FIG. 18B, after the end time included in the meeting room management information has elapsed, it is possible to promptly display the content data used for the current meeting on the electronic blackboard 200A-1 by acquiring the same card ID as the card ID acquired in step S1802 again.

A second sequence for an operation of the electronic blackboard system in the second embodiment will be described.

Figure 19A:
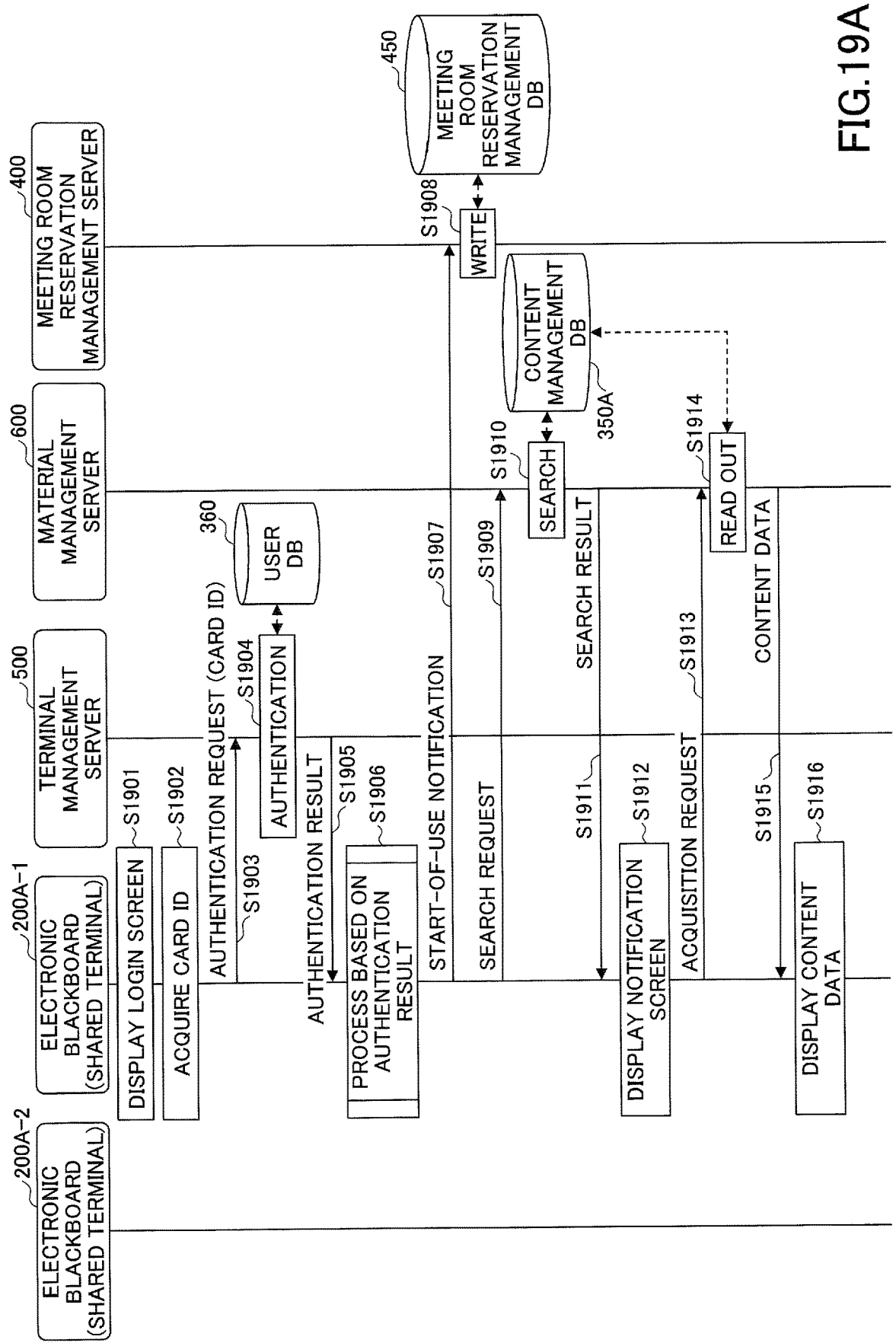
FIG. 19A, FIG. 19B, and FIG. 19C illustrates a second sequence diagram illustrating an operation of the electronic blackboard system in the second embodiment.
Figure 19B:
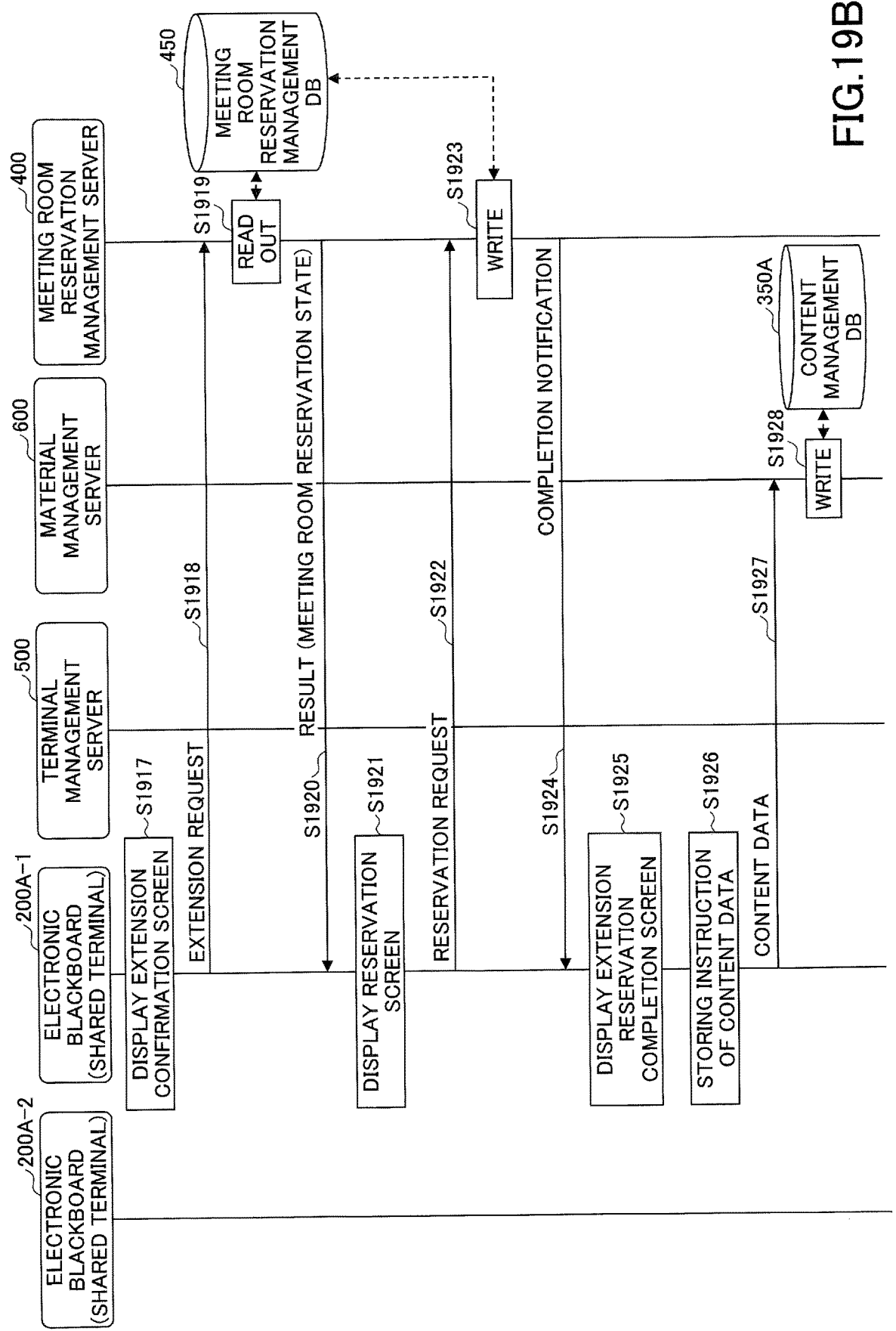
Figure 19C:
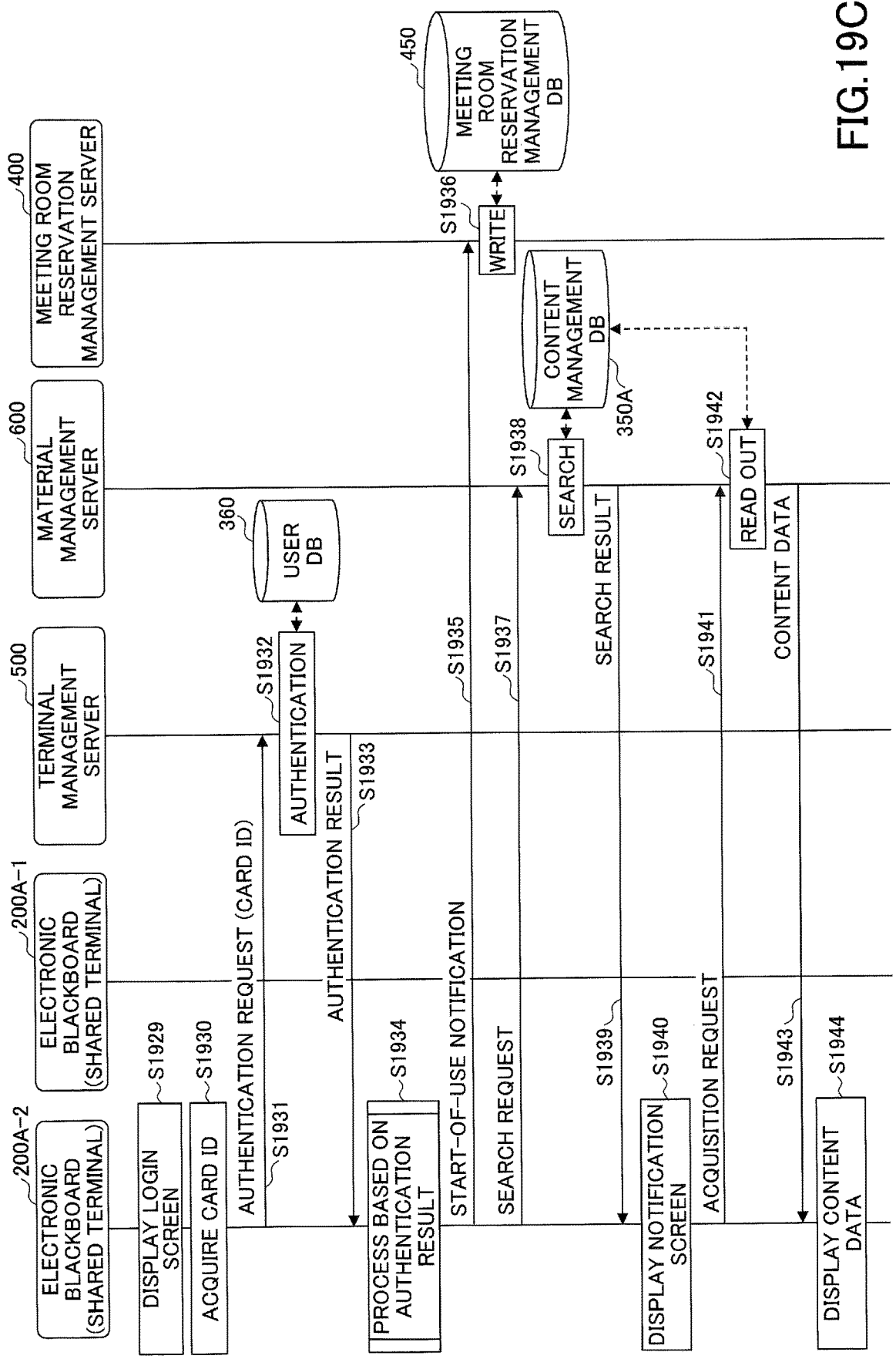

FIG. 19A, FIG. 19B, and FIG. 19C illustrate that the meeting held in the meeting room where the electronic blackboard 200A-1 is installed is extended and is continued in another meeting room where the electronic blackboard 200A-2 is installed.

Because processes from step S1901 to step S1928 in FIG. 19A and FIG. 19B are the same as processes from step S1801 to step S1828 in FIG. 18A and FIG. 18B, the explanation thereof will be omitted.

Referring to FIG. 19C, the electronic blackboard 200A-2 displays a login screen (step S1929). Subsequently, the electronic blackboard 200A-2 acquires the card ID from the IC card 3, which the user holds over the electronic blackboard 200A-2 (step S1930). The card ID to be acquired in this case is the same as the card ID acquired by the electronic blackboard 200A-1 in step S1902.

Because processes from step S1931 to step S1944 are the same as processes from step S1903 to step S1916, the explanation thereof will be omitted.

Next, a process of the electronic blackboard 200A from a time when a user authentication is successful and the content data is displayed to a time when the meeting room reservation screen is displayed will be described.

Figure 20:
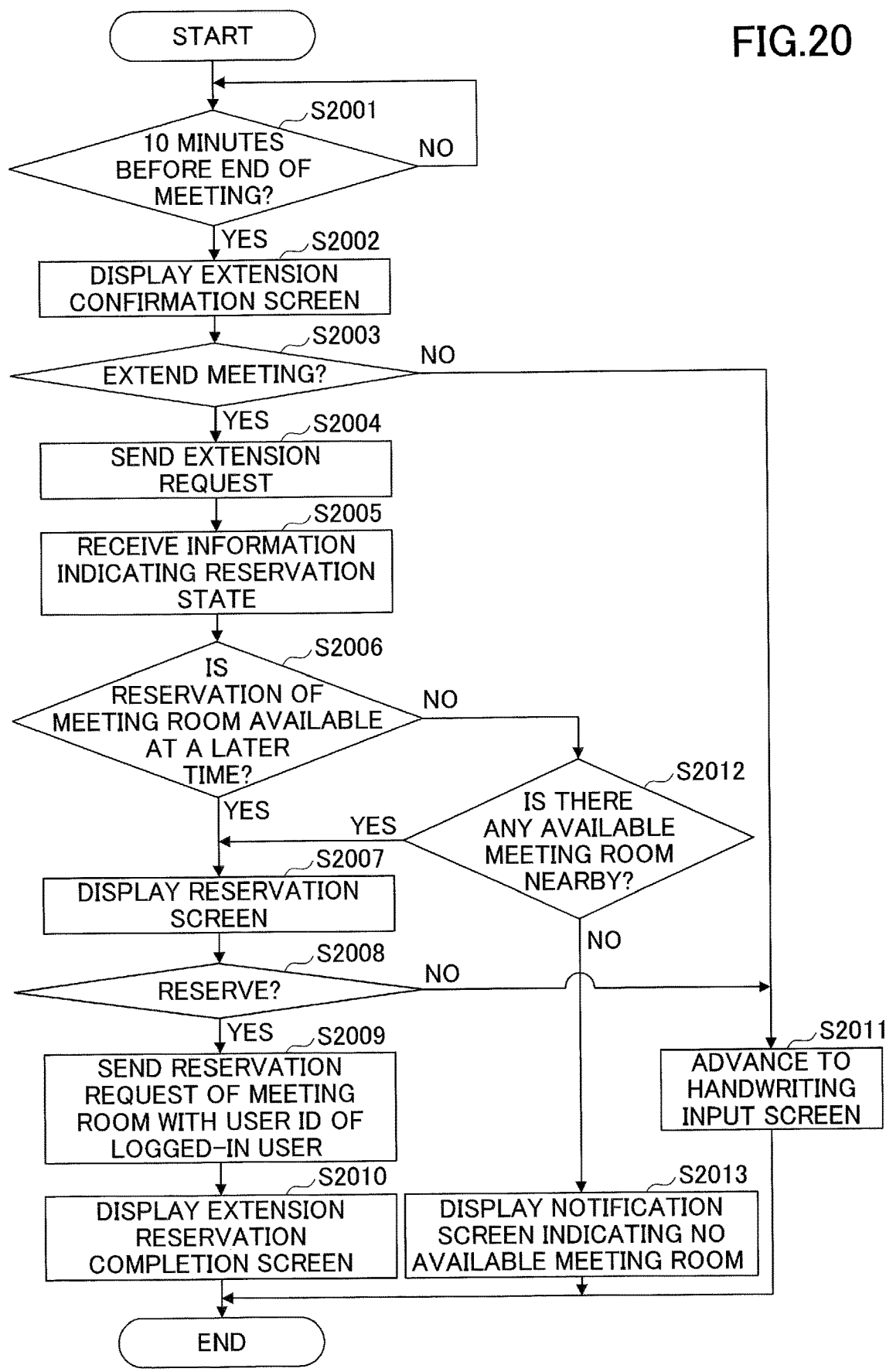
FIG. 20 is a first flowchart illustrating a process of an electronic blackboard in the second embodiment.

FIG. 20 is a first flowchart illustrating a process of an electronic blackboard in the second embodiment. FIG. 20 illustrates the processes of the electronic blackboard 200A-1 from step S1816 to step S1825 in FIG. 18A and FIG. 18B and the electronic blackboard 200A-2 from step S1916 to step S1925 in FIG. 19A and FIG. 19B.

The electronic blackboard in the second embodiment determines whether or not the current time is 10 minutes before the end time included in the reservation management information corresponding to the current meeting with respect to the meeting room reservation management server 400 (step S2001). A time of 10 minutes is an example of a predetermined time.

Specifically, the electronic blackboard 200A may acquire the reservation management information, in which the start time is written, from the meeting room reservation management server 400, and may compare the current time with the end time. The electronic blackboard 200A may periodically access the meeting room reservation management server 400 and may compare the current time with the end time by referring to the reservation management information, in which the start time is written.

In step S2001, when it is not 10 minutes before the end time, the electronic blackboard 200A stands by. In step S2001, when time is 10 minutes before the end time, the electronic blackboard 200A displays the extension confirmation screen (step S2002). Subsequently, in the extension confirmation screen, the electronic blackboard 200A determines whether or not the operation for instructing an extension of the meeting is received (step S2003).

When the corresponding operation is not accepted (step S2003), the electronic blackboard 200A proceeds to step S2011, which will be described later.

When the corresponding operation is received in step S2003, the electronic blackboard 200A sends an extension request to the meeting room reservation management server 400 (step S2004).

Subsequently, the electronic blackboard 200A receives information indicating the reservation status of the meeting room installed by its own machine from the meeting room reservation management server 400 (step S2005).

Subsequently, the electronic blackboard 200A determines whether or not the meeting room, in which the electronic blackboard 200A is installed, is available even after the completion time based on the information indicating the reservation status by the reservation managing part 39 (step S2006). When there is no meeting room, in which the electronic blackboard 200A, is installed (step S2006), the electronic blackboard 200A proceeds to step S2012, which will be described later.

When the meeting room, in which the electronic blackboard 200A is installed, is available (step S2006), the electronic blackboard 200A displays the reservation screen (step S2007), and determines whether or not the operation for instructing the reservation of the meeting room is received (step S2008). In step S2008, when no operation for instructing the reservation is performed, the electronic blackboard 200A proceeds to step S2011, which will be described later.

Upon receiving the corresponding operation in step S2008, the electronic blackboard 200A sends a reservation request to the meeting room reservation management server 400 together with the user ID obtained in the authentication (step S2009). Subsequently, when the electronic meeting room reservation management server 400 notifies a completion of the reservation, the electronic blackboard 200A displays the extension reservation completion screen, and ends the reservation process for the extension of the meeting room (step S2010).

When the corresponding operation is not accepted (step S2003), the electronic blackboard 200A displays a screen for handwriting input on the display device 220 (step S2011) and ends the process.

When there is no meeting room where the electronic blackboard 200A is installed (step S2006), the electronic blackboard 200A determines, by the reservation managing part 39, whether or not there is an available meeting room close to the meeting room where the electronic blackboard 200A is installed after the end time of the meeting room (step S2012). In the second embodiment, the meeting room on the same floor as the meeting room in which the dedicated terminal is installed may be a meeting room close to the meeting room in which the dedicated terminal is installed. In the second embodiment, the reservation managing part 39 may be preset to determine what conditions are to be the meeting room close to the meeting room in which the dedicated terminal is installed.

When there is an available meeting room closer to the meeting room (step S2012), the electronic blackboard 200A proceeds to step S2007. When there is no available meeting room nearby (step S2012), the electronic blackboard 200A displays, on the display device 220, a notification screen indicating that there is no meeting room available to be reserved after the end time (step S2013), and ends the process.

Figure 21:
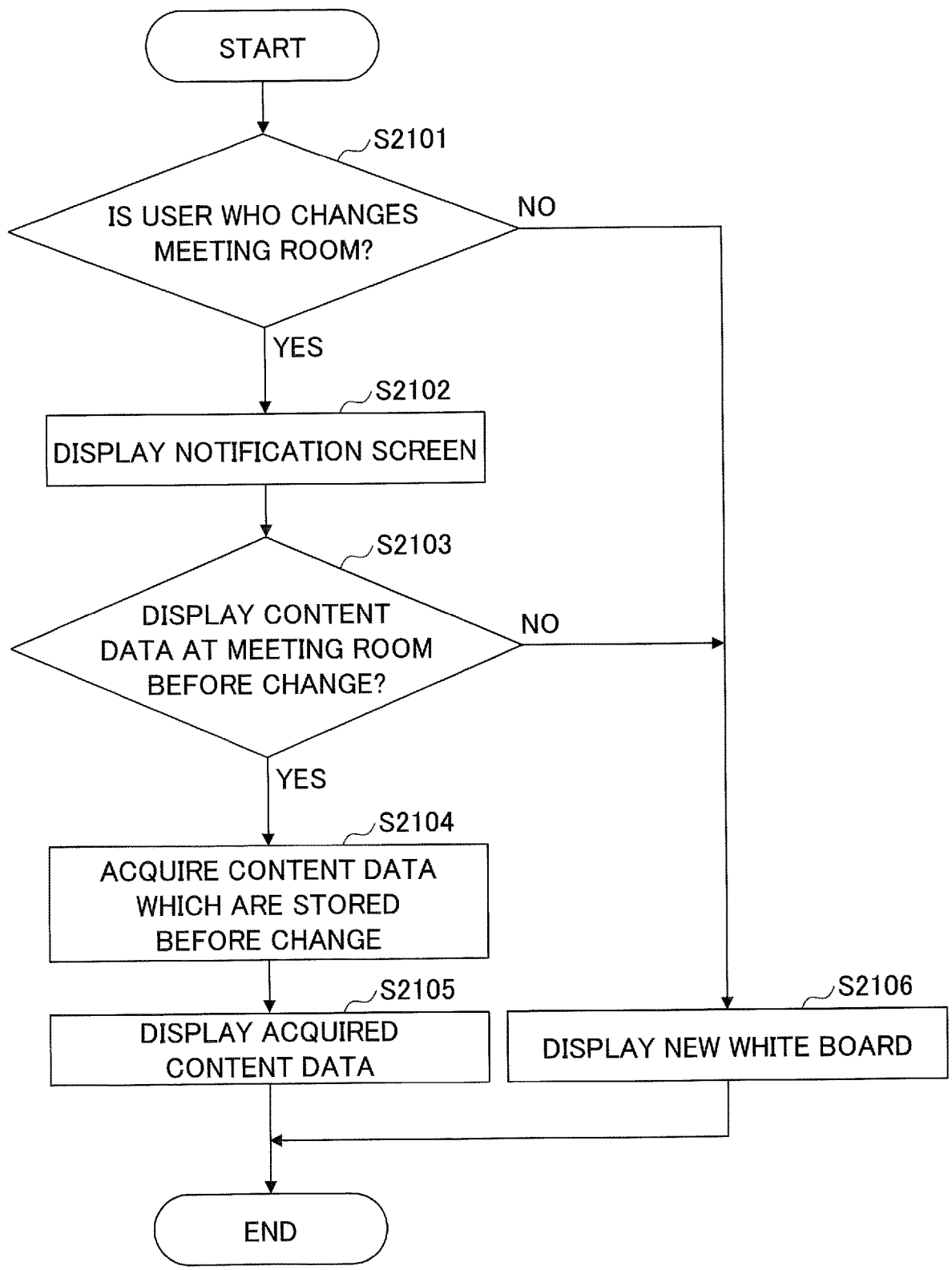
FIG. 21 is a second flowchart illustrating a process of the electronic blackboard in the second embodiment.

Next, a process of displaying the content data stored in the material management server 600 on the electronic blackboard 200A-2 will be described with reference to FIG. 21. FIG. 21 is a second flowchart illustrating a process of the electronic blackboard in the second embodiment. In FIG. 21, the processes from step S1930 to step S1944 of FIG. 19 are depicted.

The electronic blackboard 200A-2 in the second embodiment determines whether or not a card ID acquired from the IC card 3 by the acquisition providing part 28 is the card ID of the user who moved from the meeting room where the electronic blackboard 200A-1 is installed (step S2101). Specifically, the electronic blackboard 200A-2 sends the card ID to the terminal management server 500, and acquires the authentication result and the user ID. The electronic blackboard 200A-2 sends, to the material management server 600, the time when the card ID is acquired, the user ID, and the search request. A name of the meeting room, in which the electronic blackboard 200A-2 is installed, is registered, and the electronic blackboard 200A-2 may send the name of the meeting room where the electronic blackboard 200A-2 is installed, to the material management server 600 along with the search request.

The material management server 600 searches for the content management information, of which user ID matches a user ID in the search request, of which meeting room name matches the name of the meeting room in which the electronic blackboard 200A-2 is installed, and of which time period as the reservation time includes a time when the card ID is acquired, from the content management DB 350A. The material management server 600 sends information indicating presence or absence of the content management information as the search result, to the electronic blackboard 200A-2.

That is, the electronic blackboard 200A-2 determines whether or not the search result sent from the material management server 600 is a notification indicating that the corresponding content management information exists (step S2101).

When the user moves the meeting room, that is, when a notification indicating that the content management information exists in the material management server 600 is received (step S2101), the electronic blackboard 200A-2 displays a notification screen on the display device 220 for notifying that the content data to be displayed exists (Step S2102).

When the user is not a user who moved the meeting room, that is, when a notification indicating that the content management information does not exist in the material management server 600 is not received (step S2101), the electronic blackboard 200A-2 proceeds to step S2106, which will be described later.

Following step S2102, the electronic blackboard 200A-2 determines whether or not an operation for instructing to display the content data to be displayed by a schedule has been received at the notification screen (step S2103). When the operation is not received (step S2103), the electronic blackboard 200A-2 proceeds to step S2106, which will be described later.

When the corresponding operation is received (step S2103), the electronic blackboard 200A-2 acquires the content data stored before moving from the material management server 600 (step S2104). In other words, the electronic blackboard 200A-2 acquires the content data included in the content management information from the material management server 600.

Subsequently, the electronic blackboard 200A-2 displays the acquired content data on the display device 220 (step S2105), and ends this process.

At this time, the electronic blackboard 200A-2 may display a last page in the acquired content data on the display device 220 by the display control part 24. Thus, by displaying the content data on the display device 220 from the last page in the content data, it is possible to reproduce a display state of the electronic blackboard 200A-1 before moving the meeting room. Accordingly, in the second embodiment, the content data that had been displayed previously is able to be easily displayed on the electronic blackboard 200A-2.

The electronic blackboard 200A-2 may display a list of thumbnail images for all pages included in the acquired content data on the display device 220 by the display control part 24. By displaying the list of the thumbnail images, the user is able to easily select one page to be displayed from the acquired content data.

Moreover, in step S2101, when the user who moved the meeting room is not a user or when the operation of displaying the content data to be displayed in the schedule is not accepted on the notification screen, the electronic blackboard 200A-2 displays a screen for handwriting input on the display device 220 (Step S2106), and ends this process.

Figure 22A:
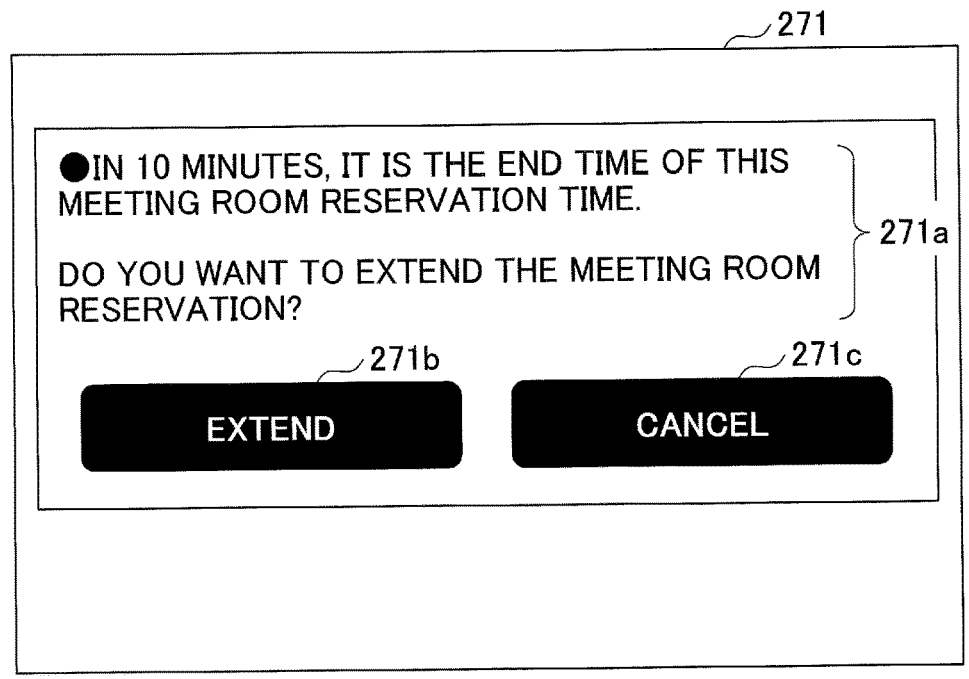
FIG. 22A is a diagram illustrating an example of an extension confirmation screen in the second embodiment.
Figure 22B:
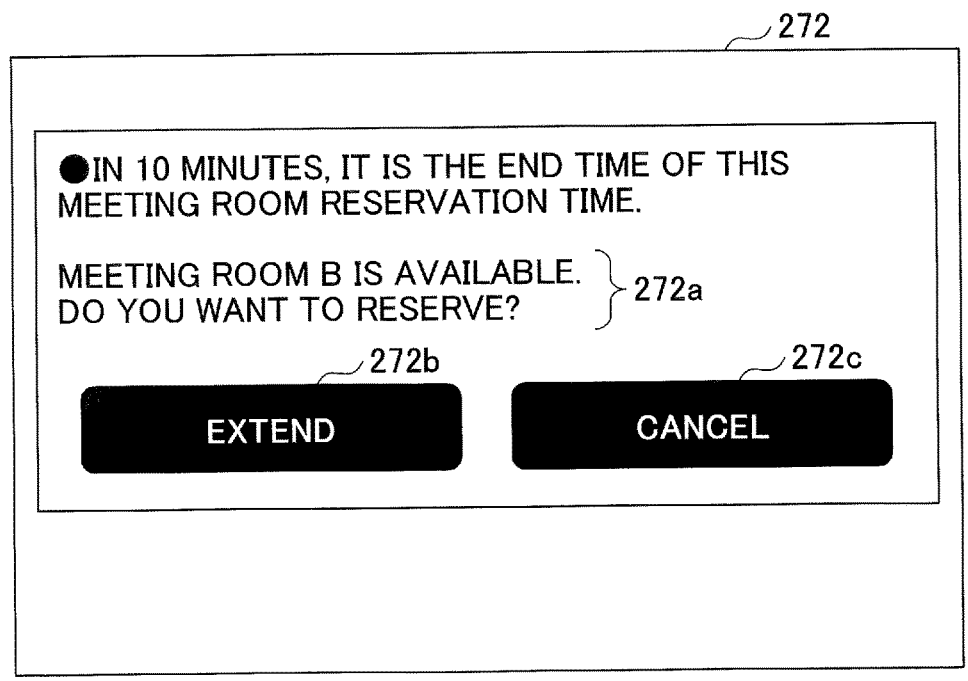
FIG. 22B is a diagram illustrating an example of a reservation screen in the second embodiment.
Figure 22C:
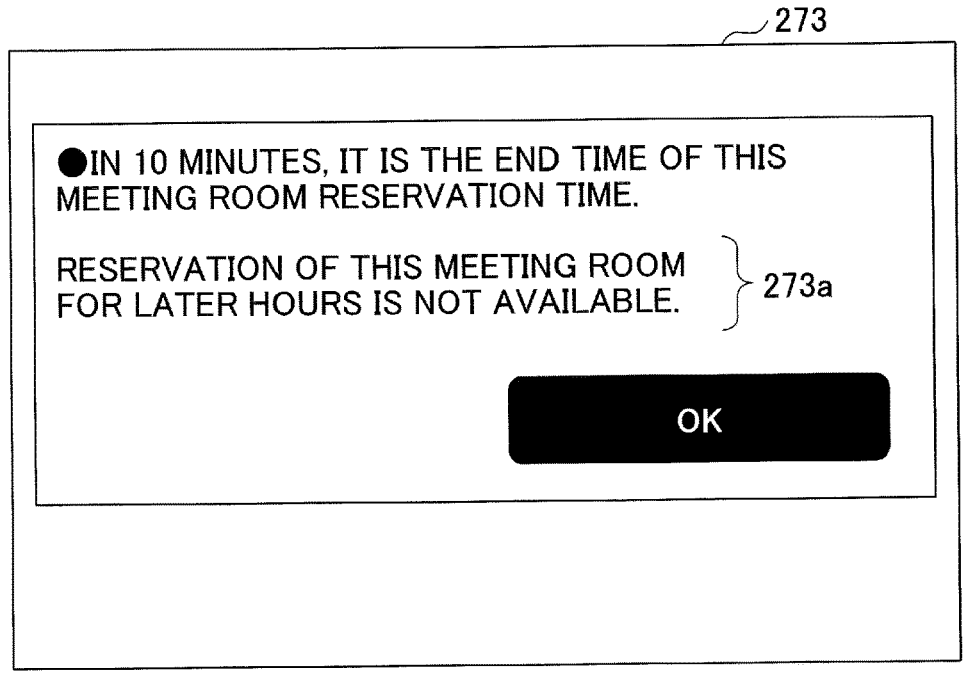
FIG. 22C is a diagram illustrating an example of a screen for notifying that there is no available meeting room in the second embodiment.
Figure 22D:
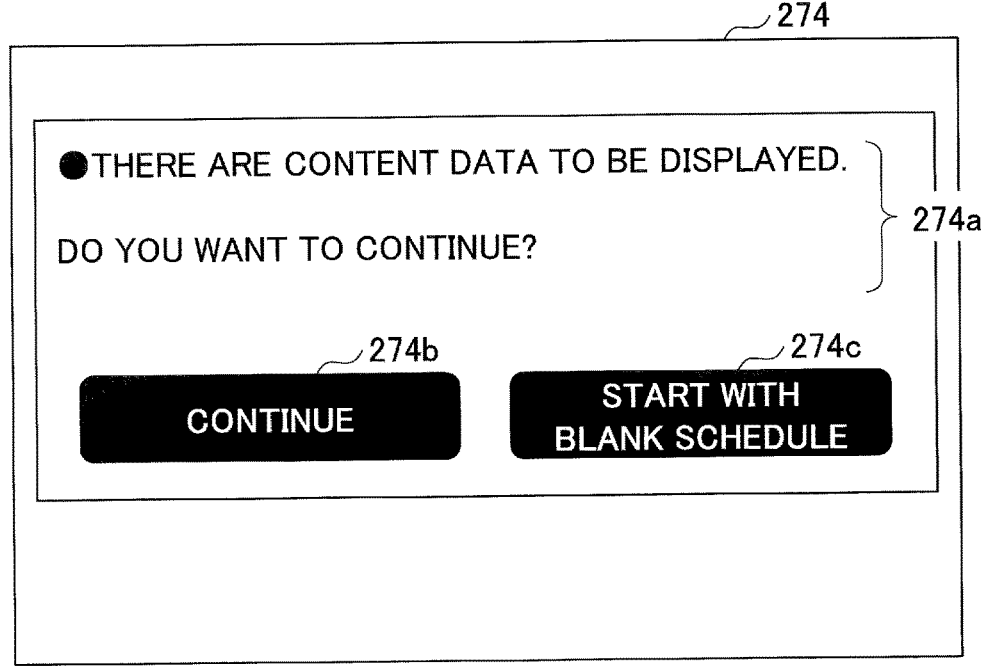
FIG. 22D is a diagram illustrating an example of a screen for notifying presence of the content data to be displayed in the second embodiment.

In the following, a display example in the electronic blackboard 200A in the second embodiment will be described with reference to FIG. 22A and FIG. 22B. In FIG. 22A and FIG. 22B, a display example of the electronic blackboard will be described in the second embodiment. FIG. 22A illustrates an example of an extension confirmation screen. FIG. 22B illustrates an example of a reservation screen. FIG. 22C illustrates an example of a screen for notifying that there is no available meeting room. FIG. 22D illustrates an example of a screen for notifying presence of the content data to be displayed.

An extension confirmation screen 271 illustrated in FIG. 22A is displayed on the display device 220 in step S1817 in FIG. 18, step S1917 in FIG. 19, and step S2002 in FIG. 20.

The extension confirmation screen 271 displays a notification 271a, and operation buttons 271b and 271c. The notification 271a includes a message indicating that the end time of the scheduled time of the meeting room will be in 10 minutes, and a message asking whether or not to extend the meeting room reservation.

When the operation button 271b is operated in the extension confirmation screen 271, and there is a meeting room available to be reserved, the display device 220 changes a screen from the extension confirmation screen 271 to the reservation screen 272 illustrated in FIG. 22B.

The reservation screen 272 displays a notification 272a including a message indicating an available meeting room and a message asking whether or not to reserve the meeting room, and operation buttons 272b and 272c.

If the operation button 271b is manipulated on the extension confirmation screen 271 and there is no meeting room available to be reserved, the display device 220 changes the screen to a screen 273 illustrated in FIG. 22C.

A notification 273a is displayed on the screen 273 indicating that there is no meeting room available to be reserved.

When the operation button 272b is manipulated in the reservation screen 272, the display device 220 changes the screen from the reservation screen 272 to a screen 274 illustrated in FIG. 22D. A notification 274a and operation buttons 274b and 274c are displayed on the screen 274.

A notification 274a includes a message indicating that the content data to be displayed exist and a message asking whether the content data is to be displayed from the last page.

When the operation button 274b is manipulated in screen 274, a last page in the contents data to be displayed is displayed on display device 220. When the operation button 274c is manipulated, a screen for handwriting input is displayed on the display device 220.

As described above, according to the second embodiment, in a case in which the meeting is held in the meeting room where the electronic blackboard 200A is installed, when time is approaching to an end time of using the meeting room, it is possible to inquire a reservation status of the meeting room and to make a reservation, directly from the electronic blackboard 200A.

Figure 23A:
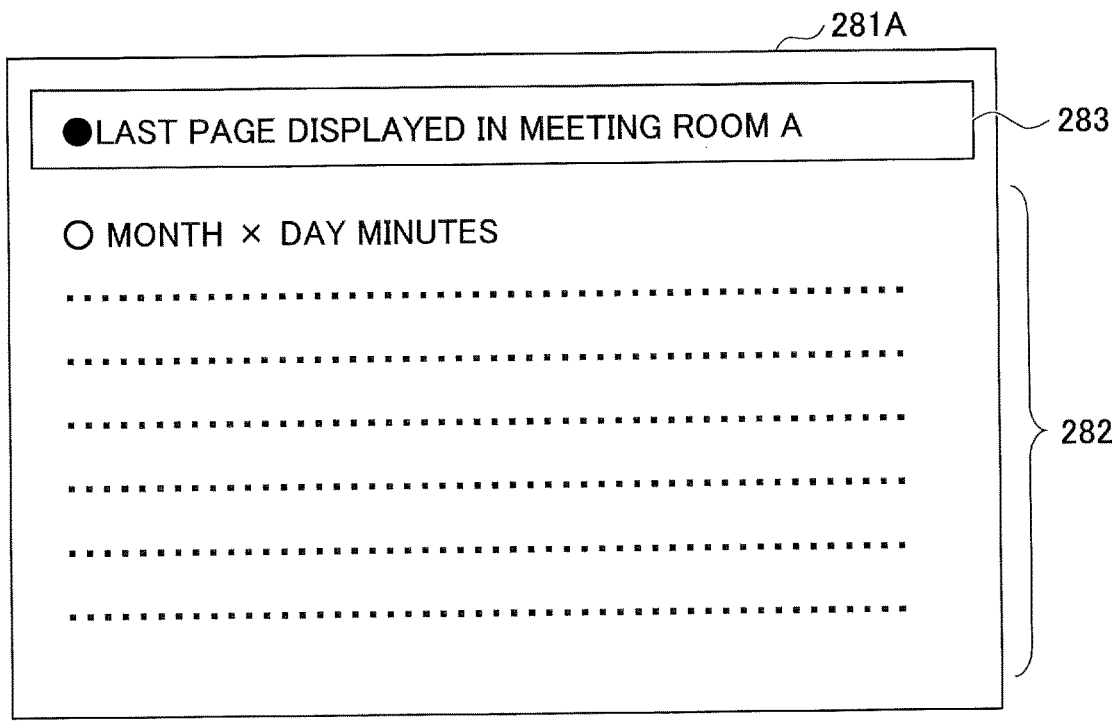
FIG. 23A is a diagram illustrating a first diagram illustrating a display example of the electronic blackboard in the second embodiment.
Figure 23B:
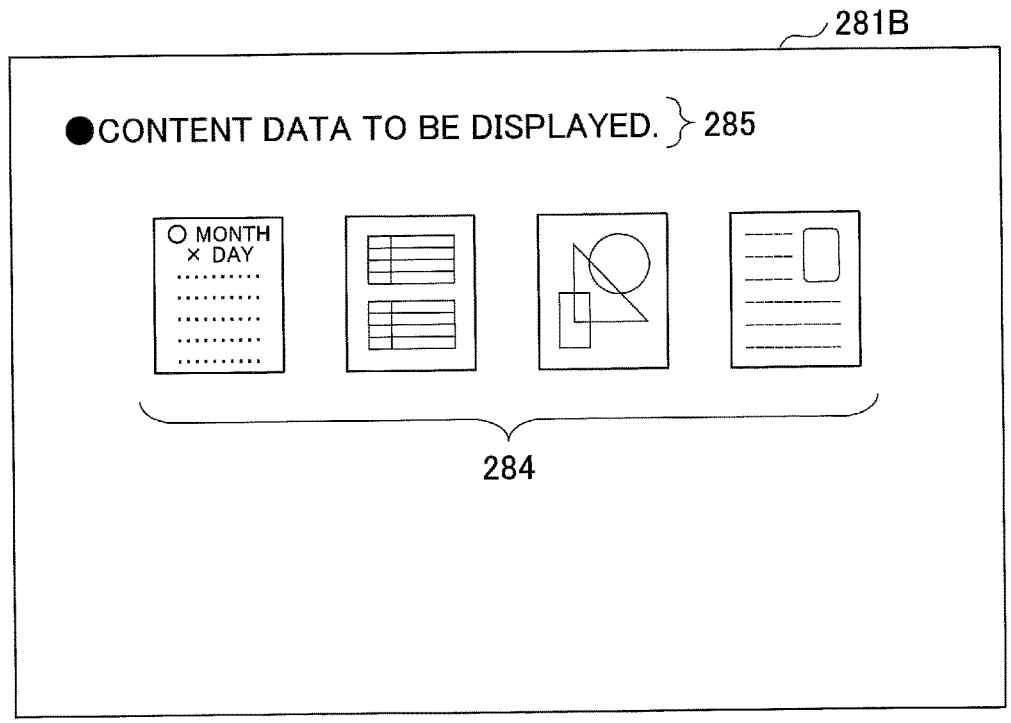
FIG. 23B is a diagram illustrating a first display example of content data on the electronic blackboard at a move-to meeting room in the second embodiment.

Next, display examples in the electronic blackboard 200A in the second embodiment will be further described with reference to FIG. 23A and FIG. 23B. FIG. 23A illustrates a first diagram illustrating a display example of the electronic blackboard in the second embodiment. FIG. 23B illustrates a first display example of content data on the electronic blackboard 200A-2 at a move-to meeting room.

The display examples illustrated in FIG. 23A and FIG. 23B are examples of screens displayed on the display device 220 of the electronic blackboard 200A-2 in step S2105 of FIG. 21.

In a screen 281A illustrated in FIG. 23A, content data 282 and message 283 are displayed.

The content data 282 corresponds to a last page displayed on the electronic blackboard 200A installed in the meeting room before the users move, and the message 283 is regarded as a message indicating that the content data 282 corresponds to the last page displayed before the users move.

As described above, according to the second embodiment, when moving to another meeting room and continuing the meeting, it is possible to transfer the content data displayed on the electronic blackboard 200A of the meeting room before the user moved, to the electronic blackboard 200A of the destination meeting room. Further, according to the second embodiment, when the content data stored in the material management server 600 from the electronic blackboard 200A installed in the meeting room before the transfer is continuously displayed on the electronic blackboard 200A at the destination, the content data is displayed from the last page. Therefore, in the second embodiment, it is possible to immediately reproduce a display state in the meeting room, in a different meeting room, to which the users move from the meeting room.

A screen 281B illustrated in FIG. 23B displays a list of thumbnail images 284 of sets of the content data stored before moving to another meeting room, and a message 286 indicating that the list of the thumbnail images 284 represents the content data to be displayed in a schedule in another meeting room.

In the second embodiment, the contents of the content data, which are scheduled to be displayed by the reservation for extension, is able to be displayed to the user in an easy-to-understand manner on the electronic blackboard 200A at the move-to meeting room. Accordingly, according to the second embodiment, in a case in the user attempts to select a desired page from the content data after the user moves to another meeting room, it is possible to easily conduct this selection.

In the second embodiment, a case is described in which a meeting is held in a meeting room where the electronic blackboard 200A is arranged; however, the second embodiment is not limited to this case. For example, the second embodiment is able to be applied in a case in which the electronic blackboard 200A is installed in a classroom at an educational institution.

Third Embodiment

A third embodiment will be described with reference to the drawings. Different from the first embodiment, in third embodiment, instead of the electronic blackboard, an image projector is used in an electronic blackboard system. Accordingly, in the description of the third embodiment below, only the differences from the first embodiment are explained, and parts functionally similar to the first embodiment are given the same numerals as those used in the description of the first embodiment, and explanations thereof will be omitted.

Figure 24:
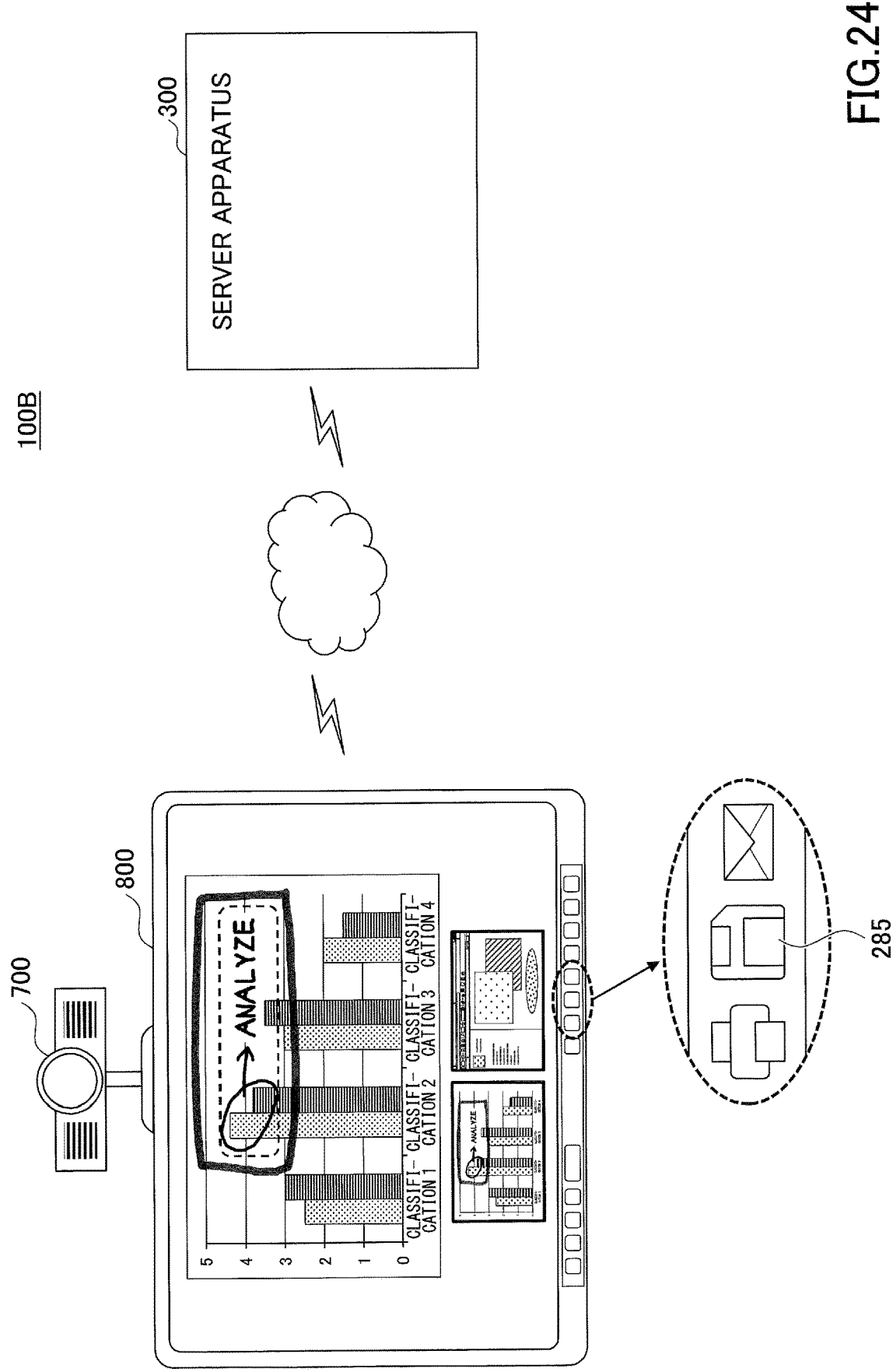
FIG. 24 is a diagram illustrating an electronic blackboard system in a third embodiment.

FIG. 24 is a diagram illustrating an electronic blackboard system in the third embodiment. The electronic blackboard system 100B illustrated in FIG. 24 includes an image projector 700 and a server apparatus 300.

The image projector 700 projects image data, which are input from a terminal device connected to the image projector 700, to a screen 800. Instead of the screen 800, for example, a white board, a wall surface, or the like may be used as the display device 230.

The image projector 700 detects a movement of an electronic pen (stylus), a hand of a user, or the like, thereby detecting a handwritten input to the screen 800 and causing an stroke image to be projected onto the screen 800.

The image projector 700 sends image data of an image projected onto the screen 800 as content data to the server apparatus 300, for example, when a save button 285 displayed on the screen 800 is operated.

In this case, the image projector 700 in the third embodiment is provided with a reading device that reads the identification information from the dedicated terminal or is connected with the reading device, sends the identification information read from the dedicated terminal to the server apparatus 300, and acquires a user ID as an authentication result. The image projector 700 corresponds to the content data, and sends the acquired user ID and information representing a time of acquiring identification information to the server apparatus 300.

Moreover, in a case in which the save button 285 is manipulated, for example, the image projector 700 may output, as content data to a portable recording medium such as a USB memory, the user ID and information indicating a time when the identification information is acquired, and stores the content data.

Next, a modification of the electronic blackboard system of the above-described embodiments will be described with reference to FIG. 25 to FIG. 27.

Figure 25:
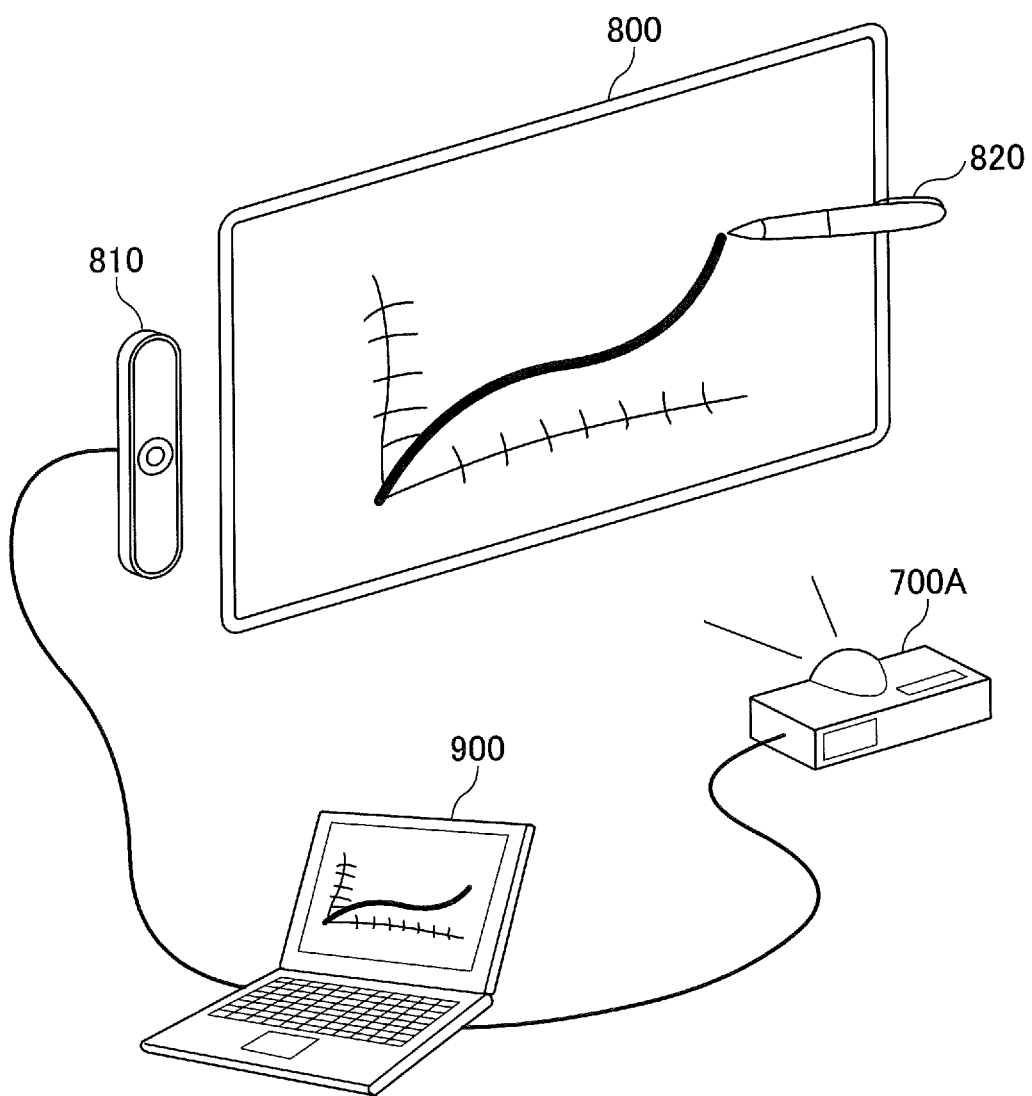
FIG. 25 is a first diagram illustrating a modification of the electronic blackboard system in the third embodiment.

FIG. 25 is a first diagram illustrating a modification of the electronic blackboard system. In the example in FIG. 25, instead of the electronic blackboard 200, a terminal device 900, an image projector 700A, and a pen motion detecting device 810 are included in the electronic blackboard system.

A terminal device 900 is connected to the image projector 700A and the pen motion detecting device 810 by wired connections.

The image projector 700A causes image data input by terminal device 900 to be projected onto the screen 800.

A pen motion detecting device 810 communicates with an electronic pen 820, and detects an operation of the electronic pen 820 near the screen 800. Specifically, the electronic pen 820 detects coordinate information representing a point indicated by the electronic pen 820 on the screen 800 and sends the coordinate information to the terminal device 900.

The terminal device 900 generates stroke image data representing a stroke image input by the electronic pen 820 based on the coordinate information received from the pen motion detecting device 810, and causes the image projector 700A to draw a stroke image on the screen 800.

The terminal device 900 is provided with a reading device that reads the identification information from the dedicated terminal or is connected with the reading device, sends the identification information read from the dedicated terminal to the server apparatus 300, and acquires the user ID as the authentication result. The terminal device 900 corresponds to the content data and sends the acquired user ID and information representing the time of acquiring the identification information to the server apparatus 300.

At this time, the terminal device 900 generates content data including superimposed image data representing an image projected to the image projector 700A. The terminal device 900 selects the content data including stroke information from the content data and sends the selected content data to the server apparatus 300.

Figure 26:
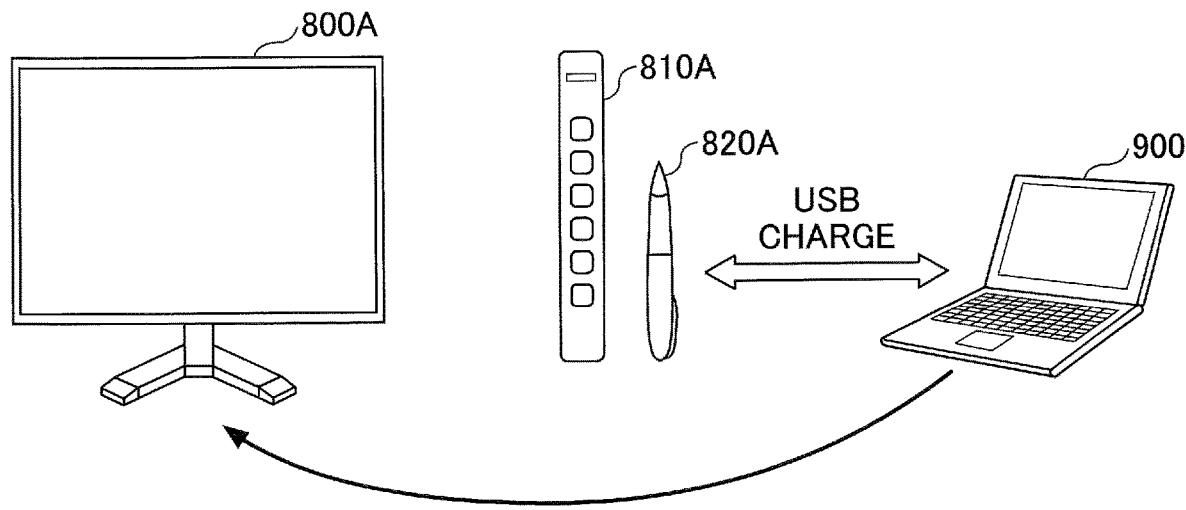
FIG. 26 is a second diagram illustrating a modification of the electronic blackboard system in the third embodiment.

FIG. 26 is a second diagram illustrating a modification of the electronic blackboard system. In the example of FIG. 26, instead of the electronic blackboard 200, the terminal device 900, a screen 800A, and the pen motion detecting device 810 are included in the electronic blackboard system.

A pen motion detecting device 810 is disposed near the screen 800A, detects coordinate information representing a point indicated by an electronic pen 820A on the screen 800A, and sends the coordinate information to the terminal device 900. In the example of FIG. 26, the electronic pen 820A may be charged via a USB connector by the terminal device 900.

The terminal device 900 generates image data of the stroke image input by the electronic pen 820A based on the coordinate information received from the pen motion detecting device 810, and displays the image data on the screen 800A.

The terminal device 900 in the third embodiment generates content data including superimposed image data representing an image projected to the image projector 700A. The terminal device 900 selects the content data including the stroke information from the content data, and sends the selected content data to the server apparatus 300.

Figure 27:
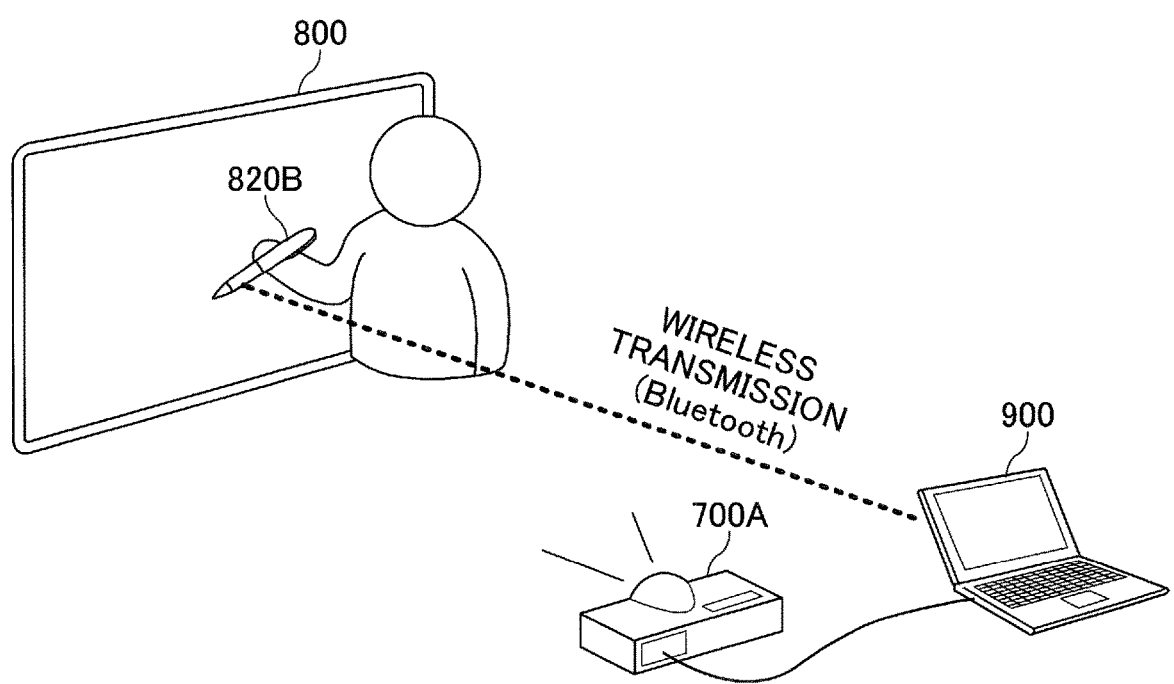
FIG. 27 is a third diagram illustrating a modification of the electronic blackboard system.

FIG. 27 is a third diagram illustrating a modification of the electronic blackboard system. In the example of FIG. 27, instead of the electronic blackboard 200, a terminal device 900 and the image projector 700A are included in the electronic blackboard system.

The terminal device 900 performs wireless communication (such as Bluetooth) with the electronic pen 820B, and receives coordinate information of a point indicated by the electronic pen 820B on the screen 800. The terminal device 900 generates the image data of the stroke image input by the electronic pen 820B based on the received coordinate information, and causes the stroke image to be projected onto the screen 800 by the image projector 700A.

Also, the terminal device 900 generates content data including superimposed image data representing an image projected on the image projector 700A. The terminal device 900 selects the content data including the stroke information from the content data, and sends the selected content data to the server apparatus 300.

As described above, each of the first, second, and third embodiments described above is able to be applied in various system configurations.

The functions of the first, second, and third embodiments described above may also be implemented by one or more processing circuits. Herein, a "processing circuit" includes a processor programmed to perform each function by software, such as a processor implemented by an electronic circuit, a device such as an Application Specific Integrated Circuit (ASIC), a digital signal processor, a Field Programmable Gate Array, a System On a Chip (SOC), a Graphics Processing part (GPU), or a conventional circuit module designed to perform each function as described above.

Although the invention has been described in accordance with the first, second, and third embodiments, the invention is not limited to the requirements illustrated in the first, second, and third embodiments. In these respects, the subject matter of the present invention may be varied without prejudice and may be suitably defined in its application.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, and the like. If embodied in hardware, each block may represent a circuit or a number of interconnected circuits to implement the specified logical function(s).

What is claimed is:

1. An information processing system, comprising:
a storage device; and
a processor electrically coupled to the storage device, the processor being configured to:
transmit at least one content to be displayed on a first electronic blackboard;
in response to receiving a request from the first electronic blackboard, store the content in the storage device, the content including a last page that is displaced last on the first electronic blackboard, and the last page being associated with information about a second electronic blackboard, upon a request to display the content on another electronic blackboard;
in response to receiving a second request from the second electronic blackboard, retrieve, from the storage device, the content including the last page associated with the information about the second electronic blackboard, and
provide a first user interface to the second electronic blackboard, the first user interface including a first display region and a second display region, the first display region being for displaying the last page of the retrieved content, the second display region being set to display a message for a user, and the message being about the last page.

2. The information processing system according to claim 1, wherein the storage device is configured to store one or more thumbnail images, each thumbnail image being associated with a given content to be displayed on the first electronic blackboard,
wherein the processor is configured to:
in respond to receiving the second request from the second electronic blackboard, retrieve, from the storage device, the one or more thumbnail images; and
provide a second user interface to the second electronic blackboard, the second user interface including a third display region and a fourth display region, the third display region being for displaying the retrieved thumbnail images, the fourth display region being set to display a second massage for the user, and the second message being about the retrieved thumbnail images.

3. A method for processing information comprising:
transmitting at least one content to be displayed on a first electronic blackboard;
in response to receiving a request from the first electronic blackboard, storing the content in a storage device, the content including a last page that is displaced last on the first electronic blackboard, and the last page being associated with information about a second electronic blackboard, upon a request to display the content on another electronic blackboard;
in response to receiving a second request from the second electronic blackboard, retrieving, from the storage device, the content including the last page associated with the information about the second electronic blackboard; and
providing a first user interface to the second electronic blackboard, the first user interface including a first display region and a second display region, the first display region being for displaying the last page of the retrieved content, the second display region being set to display a message for a user, and the message being about the last page.

* * * * *